(12) United States Patent
Yamazaki

(10) Patent No.: US 7,652,793 B2
(45) Date of Patent: Jan. 26, 2010

(54) IMAGE PROCESSING METHOD AND IMAGE PROCESSING APPARATUS, AND IMAGE FORMING APPARATUS COMPRISING IMAGE PROCESSING APPARATUS

(75) Inventor: Yoshirou Yamazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 615 days.

(21) Appl. No.: 11/398,589

(22) Filed: Apr. 6, 2006

(65) Prior Publication Data

US 2006/0256151 A1    Nov. 16, 2006

(30) Foreign Application Priority Data

Apr. 8, 2005    (JP)    ............... 2005-112747

(51) Int. Cl.
   *H04N 1/405*    (2006.01)
(52) U.S. Cl. ..................... 358/3.09; 358/3.14
(58) Field of Classification Search .................. 358/1.9, 358/2.1, 3.01, 3.03, 3.05–3.06, 3.09–3.12, 358/3.14
   See application file for complete search history.

(56) References Cited

U.S. PATENT DOCUMENTS 4,543,613 A * 9/1985 Sakamoto .................. 358/3.17
5,124,803 A * 6/1992 Troxel ....................... 358/3.26
5,469,267 A * 11/1995 Wang ........................ 358/3.21
5,473,439 A   12/1995 Pappas
5,822,451 A * 10/1998 Spaulding et al. ........... 382/162

FOREIGN PATENT DOCUMENTS

JP    06-245060 A    9/1994
JP    2002-240327 A   8/2002

* cited by examiner

Primary Examiner—Thomas D Lee
Assistant Examiner—Stephen M Brinich
(74) Attorney, Agent, or Firm—Birch, Stewart, Kolasch & Birch, LLP

(57) ABSTRACT

An image processing method comprises the steps of: determining dot arrangement in forming an image with dots on a recording medium; and forming the image on the recording medium by means of a dot formation device according to the dot arrangement, wherein dot arrangement data concerning each of dot formation positions on the recording medium is created from input image data, according to a dot model which is established with respect to each of the dot formation positions, the dot model being determined according to at least one of dot formation characteristics of the dot formation device and fixing characteristics of the recording medium, and including information relating to at least one of a dot shape, dot density, a dot position, and presence or absence of a satellite, of each dot formed on the recording medium.

16 Claims, 18 Drawing Sheets

FIG.7A
| 11 | 21 | 31 |
|----|----|----|
| 12 | 22 | 32 |
| 13 | 23 | 33 |
FIG.7E
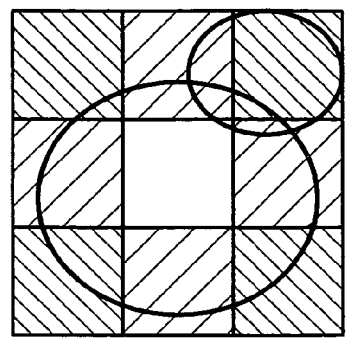
FIG.7B
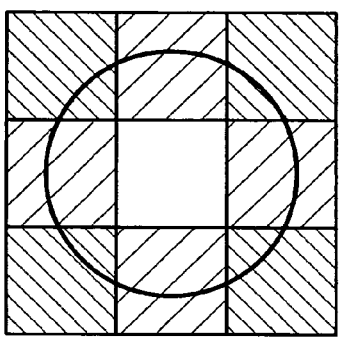
FIG.7F
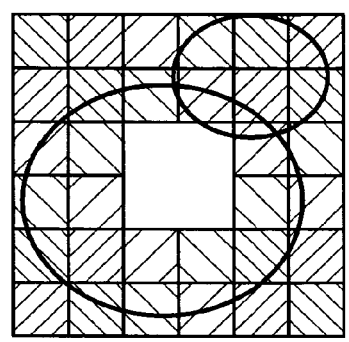
FIG.7C
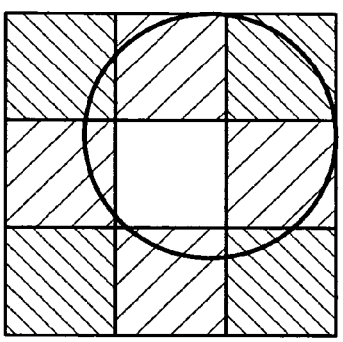
FIG.7G
| 0.1D | 0.9D | 0.6D |
|------|------|------|
| 0.2D | D    | 0.8D |
| 0.0D | 0.2D | 0.1D |
FIG.7D
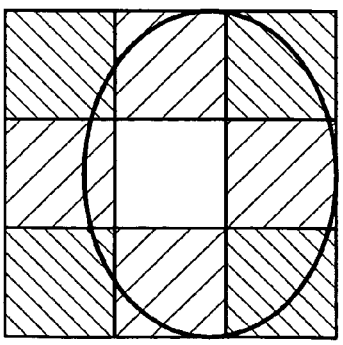

| EC(11) | EC(21) | EC(31) |
|--------|--------|--------|
| EC(12) | EC(22) | EC(32) |
| EC(13) | EC(23) | EC(33) |

FIG.14

| 2 | 9 | 7 |
|---|---|---|
| 2 | 10 | 9 |
| 0 | 2 | 1 |

DOT FORMATION POSITION

IMAGE PROCESSING METHOD AND IMAGE PROCESSING APPARATUS, AND IMAGE FORMING APPARATUS COMPRISING IMAGE PROCESSING APPARATUS

BACKGROUND OF THE INVENTION

1. Field of the Invention

The present invention relates to an image processing method, an image processing apparatus, and an image forming apparatus comprising an image processing apparatus, and more particularly, to half-toning technology based on the effects of various errors occurring when dots are actually formed by a printer.

2. Description of the Related Art

An image forming apparatus, such as an inkjet printer, thermal printer, or LED printer, is known which forms images on a recording medium by means of dots. In an image forming apparatus of this kind, images are formed by means of a plurality of dots formed by liquid ink droplets, toner particles, or the like. Therefore, basically, an image is formed according to existence and nonexistence of dots on a recording medium such as white paper. Since the number of inks used is limited, a half-toning method is known which is used to achieve continuous tonal gradation by means of a limited number of inks.

For example, Japanese Patent Application Publication No. 6-245060 discloses a printing method and a system which are based on a model that generates an output color half-tone image corresponding to a color input signal.

This can improve the quality of the printed image by applying an error-diffusion halftoning technique, or a least-squares halftoning technique, to a color printer model in which the printed dots are approximately circular and are assumed to be larger than the minimum dimension required to cover the page completely.

Moreover, for example, Japanese Patent Application Publication No. 2002-240327 discloses a method in which the data of the pixels of the image to be recorded is quantized and ejection of ink from nozzles is controlled in accordance with this quantized data. In that method, when quantization error for each of the processed pixels, which is the error between the data achieved by quantization and the data originally to be recorded, is diffused (distributed) to the surrounding pixels, then the deterioration in image quality caused by the ink ejection state is reduced by correcting the quantization error on the basis of ejection state data of the nozzles corresponding to processed pixels.

Although Japanese Patent Application Publication No. 6-245060 discloses an error diffusion method using a plurality of color printer models, it involves a possibility in that it may be difficult to achieve sufficient improvement in image quality, because it is based on circular dots and the great effects on image quality caused by dot position error or size error are not taken into account.

Furthermore, in the method described in Japanese Patent Application Publication No. 2002-240327, the spreading of the ink is reflected in the actual value of the pixel under examination. For example, the ideal value is 255, but it may become a value of 310 or 180 due to variation. The differential with respect to the ideal value is reflected in the error, but this does not directly affect whether a dot is formed onto the position of the pixel under examination or not. Furthermore, although the effects of the spreading of ink from the peripheral pixels are reflected in the error of the pixel under examination, the error diffused from the adjacent pixels, which is taken into account when the pixel under examination is quantized, includes the effects of ink spreading from adjacent pixels to the adjacent pixels, and the quantization error in the adjacent pixels. However, the method described in Japanese Patent Application Publication No. 2002-240327 is not based on the effects of ink spreading from adjacent pixels into the pixels adjacent to the pixel under examination, and therefore, it is difficult that the effects of the projection of the ink droplets are reflected accurately in the pixel under examination.

SUMMARY OF THE INVENTION

The present invention has been contrived in view of these circumstances, an object thereof being to provide an image processing method, an image processing apparatus, and an image forming apparatus comprising an image processing in which a high-quality dot arrangement can be obtained according to a half-toning technique based on the effects of various errors which can occur when dots are formed in an actual printer.

In order to attain the aforementioned object, the present invention is directed to an image processing method, comprising the steps of: determining dot arrangement in forming an image with dots on a recording medium; and forming the image on the recording medium by means of a dot formation device according to the dot arrangement, wherein dot arrangement data concerning each of dot formation positions on the recording medium is created from input image data, according to a dot model which is established with respect to each of the dot formation positions, the dot model being determined according to at least one of dot formation characteristics of the dot formation device and fixing characteristics of the recording medium, and including information relating to at least one of a dot shape, dot density, a dot position, and presence or absence of a satellite, of each dot formed on the recording medium.

According to this aspect of the present invention, the dot arrangement is determined in accordance with the dot formation characteristics of the dot formation device (for example, the ejection characteristics of the nozzles), and therefore it is possible to suppress image defects caused by the characteristics of the dot formation device. Furthermore, even in the case of recording media having different fixing characteristics, it is possible to achieve a suitable dot formation by using a dot model corresponding to the recording medium.

Preferably, when the dot arrangement data is created from the input image data according to the dot model, dot formation is determined by comparing a prescribed threshold value with result obtained by subtracting data corresponding to density already achieved in a dot formation position under examination of the dot formation positions due to effect from at least one of the dots which are on the periphery of the dot formation position under examination, from the input image data.

According to this aspect, it is possible to reduce the computational load by adopting a threshold value matrix for determining dot formation, and hence image processing can be performed more efficiently.

Preferably, when the dot arrangement data is created from the input image data according to the dot model, dot formation concerning a dot formation position under examination of the dot formation positions is determined according to effect of an error generated concerning at least one of the dot formation positions for which the dot formation is already determined and which are on the periphery of the dot formation position under examination.

According to this aspect, it is possible to achieve dot formation of higher quality, by introducing the effects of errors into the calculation.

Preferably, when the dot arrangement data is created from the input image data according to the dot model, dot formation concerning a dot formation position under examination of the dot formation positions is determined by comparing an absolute value of an error generated if no dot is formed, with an absolute value of a generated error of the dot model having a lowest absolute value of an error generated if a dot is formed, of all the dot models which can be selected for the dot formation position under examination.

For example, in cases where there is marked positional error in the dot model (for example, cases where the dot is situated at one end, rather than the center, of a 3×3 mesh, when the dot model is considered), or cases where another dot is formed in a dot formation position where dot formation has already been determined, then there may be situations where it is determined to form a dot if determination is based simply on a comparison with a prescribed threshold value, as described above, for instance. In situations of this kind, in terms of the position where the dot is actually ejected, the error can accumulate. However, according this aspect of the present invention, by comparing the lowest value of the absolute values of the error generated due to all of the dot models which can be formed at the dot formation position, with the absolute value of the error generated when no dot is formed, it is possible to prevent accumulation of errors of this kind.

Preferably, a plurality of the dot models are established for each of the dot formation positions.

According to this aspect, it is possible to cope with variation of the dot size, by providing a plurality of functions, for each dot size, for example.

Preferably, the dot model is previously created and stored in a storage device.

According to this aspect, it is possible to simplify processing yet further by storing dot formation functions in advance.

In order to attain the aforementioned object, the present invention is also directed to an image processing apparatus which determines dot arrangement in forming an image with dots on a recording medium by means of a dot formation device, the image processing apparatus comprising: a dot model setting device which establishes a dot model which is established with respect to each of dot formation positions, is determined according to at least one of dot formation characteristics of the dot formation device and fixing characteristics of the recording medium, and includes information relating to at least one of a dot shape, dot density, a dot position, and presence or absence of a satellite, of each dot formed on the recording medium; and a halftoning device which creates dot arrangement data for each of the dot formation positions, from input image data, according to the dot model.

According to this aspect of the present invention, the dot arrangement is determined in accordance with the dot formation characteristics of the dot formation device, and therefore it is possible to suppress image defects caused by the characteristics of the dot formation device. Furthermore, even in the case of recording medium having different fixing characteristics, it is possible to achieve a suitable dot formation by using a dot model corresponding to the recording medium.

Preferably, the halftoning device includes: an effect addition unit which, when the dot arrangement data is created from the input image data according to the dot model, subtracts data corresponding to density already achieved in a dot formation position under examination of the dot formation positions due to effect from at least one of the dots which are on the periphery of the dot formation position under examination, from the input image data; and a threshold value comparison unit comparing a result obtained by the effect addition unit with a prescribed threshold value, wherein dot formation is determined by comparing the result obtained by the effect addition unit with the prescribed threshold value.

According to this aspect, it is possible to reduce the computational load by adopting a threshold value matrix for determining dot formation, and hence image processing can be performed more efficiently.

Preferably, the halftoning device includes a peripheral error addition unit which, when the dot arrangement data is created from the input image data according to the dot model, carries out calculation according to effect on a dot formation position under examination of the dot formation positions, the effect being based on an error generated concerning at least one of the dot formation positions for which the dot formation is already determined and which are on the periphery of the dot formation position under examination.

Preferably, the halftoning device includes: a generated error calculation unit which, when the dot arrangement data is created from the input image data according to the dot model, calculates generated errors if a dot is formed, of all the dot models which can be selected for a dot formation position under examination of the dot formation positions, and an error generated if no dot is formed; and a generated error comparison unit comparing an absolute value of the generated error of the dot model having the lowest absolute value of an error, with an absolute value of the error generated if no dot is formed, wherein dot formation is determined by comparing the absolute value of the generated error if no dot is formed with the lowest value of the absolute values of the generated errors of all the dot models corresponding to the dot formation position under examination.

According to this aspect, even if there is marked positional error in the dot model, for example, or if another dot is to be formed at a dot formation position for which dot formation has already been determined, it is still possible to determine dot formation accurately, and to prevent the accumulation of errors at the dot formation position.

Preferably, a plurality of the dot models are established for each of the dot formation positions.

According to this aspect, it is possible to cope with modulation of the dot size, by providing a plurality of functions, for each dot size, for example.

Preferably, the dot model setting device includes a storage device which stores the dot model created in advance.

According to this aspect, by storing dot models in advance, it is possible to simplify processing yet further.

In order to attain the aforementioned object, the present invention is also directed to an image forming apparatus, comprising the image processing apparatus as defined above.

According to this aspect, it is possible to obtain an image formed by dots of high quality.

In more specific terms, desirably, the image processing method for achieving the aforementioned object comprises the steps described below.

In other words, desirably, the image processing method comprises the steps of: setting an array indicating the sequence of dot formation positions for which it is to be determined whether to form a dot by a dot formation device or not, at the pixel positions on the recording medium; setting a plurality of the dot models for each dot formation position on the recording medium, each dot model containing information relating to at least one of the dot shape, dot density, dot position, and presence or absence of a satellite, of the dot formed on the recording medium, as determined on the basis of at least one of the dot formation characteristics of the dot formation device corresponding to the dot formation position and the fixing characteristics of the recording medium; reading out a dot formation position to be examined, according to the array; reading out one dot model from the plurality of dot models corresponding to the dot formation position under examination; subtracting the data corresponding to the density already achieved in the dot formation position under examination due to the effects from already determined dots on the periphery of that dot formation position, from the input image data, and comparing the result of this subtraction with a prescribed threshold value; determining that a dot is to be formed at the dot formation position under examination, and storing the quantization result corresponding to the dot model used to determine dot formation, if the subtraction result is greater than the threshold value; calculating the effect on the peripheral pixels caused by forming a dot at the dot formation position under examination, if it is determined that a dot is to be formed according to the dot model used to determine dot formation; taking another dot model from the plurality of dot models, if the subtraction result is not greater than the threshold value; and determining that a dot is not to be formed at the dot formation position under examination and storing a quantization result corresponding to a case where no dot is formed, if the subtraction result is not greater than the corresponding threshold value in the case of any of the plurality of dot models.

Furthermore, desirably, the image processing method comprises the steps of: setting dot models for each dot formation position on the recording medium, each dot model containing information relating to at least one of the dot shape, dot density, dot position, and presence or absence of a satellite, of the dot formed on the recording medium, as determined on the basis of at least one of the dot formation characteristics of the dot formation device corresponding to the dot formation position and the fixing characteristics of the recording medium; reading out the dot formation position to be examined, and the dot model corresponding to same, in accordance with a prescribed sequence; comparing the sum value obtained by adding together the image signal at the dot formation position under examination, the effect from already determined dots on the periphery of the dot formation position under examination, and the error distributed by error diffusion from the already formed peripheral dots into the dot formation position under examination, with a prescribed threshold value; determining that a dot is to be formed at the dot formation position under examination and storing a quantization result corresponding to the dot model used to determine dot formation, if the sum value is greater than the threshold value; calculating the effect on the peripheral pixels caused by forming a dot at the dot formation position under examination according to the dot model used to determine dot formation, and calculating the error distributed to peripheral pixels by multiplying a previously established error diffusion coefficient by the generated error determined by subtracting the value corresponding to the dot formation position under examination in the dot model from the aforementioned sum value, if it is determined that a dot is to be formed; and determining that a dot is not to be formed at the dot formation position under examination, storing a quantization result corresponding to a case where no dot is formed, and calculating the error distributed to the peripheral pixels by multiplying the error diffusion coefficient by the generated error, if the sum value is not greater than the threshold value.

Furthermore, desirably, the image processing method comprises the steps of: setting dot models for each dot formation position on the recording medium, each dot model containing information relating to at least one of the dot shape, dot density, dot position, and presence or absence of a satellite, of the dot formed on the recording medium, as determined on the basis of at least one of the dot formation characteristics of the dot formation device corresponding to the dot formation position and the fixing characteristics of the recording medium; reading out the dot formation position to be examined, and the dot model corresponding to same, in accordance with a prescribed sequence; comparing the sum value obtained by adding together the image signal at the dot formation position under examination, the effect from already determined dots on the periphery of the dot formation position under examination, and the error distributed by error diffusion from the already formed peripheral dots into the dot formation position under examination, with a prescribed threshold value; determining that a dot is to be formed at the dot formation position under examination and storing a quantization result corresponding to the dot model used in the determination of dot formation, if the sum value is greater than the threshold value; calculating the effect on the peripheral pixels caused by forming a dot at the dot formation position under examination, if it is determined that a dot is to be formed according to the dot model used to determine dot formation, and calculating the error distributed to peripheral pixels by multiplying a previously established error diffusion coefficient by the generated error determined by subtracting the values corresponding to the dot formation position under examination and the peripheral positions at which dots have already been formed in the dot model, from the aforementioned sum value; and determining that a dot is not to be formed at the dot formation position under examination, storing a quantization result corresponding to a case where no dot is formed, and calculating the error distributed to the peripheral pixels by multiplying the error diffusion coefficient by the sum value, if the sum value is not greater than the threshold value.

Furthermore, desirably, the image processing method comprises the steps of: setting dot models for each dot formation position on the recording medium, each dot model containing information relating to at least one of the dot shape, dot density, dot position, and presence or absence of a satellite, of the dot formed on the recording medium, as determined on the basis of at least one of the dot formation characteristics of the dot formation device corresponding to the dot formation position and the fixing characteristics of the recording medium; reading out the dot formation position to be examined, and a plurality of dot models corresponding to same, in accordance with a prescribed sequence; calculating a first sum value for each dot model of the plurality of dot models read out, the first sum value being the sum of the value obtained by adding together the image signal at the dot formation position under examination, the effects from already determined dots on the periphery of the dot formation position under examination, and the error distributed to the dot formation position under examination from already formed peripheral dots according to an error diffusion method, plus the value corresponding to the dot formation position under examination in the dot model, or plus the value corresponding to the dot formation position under examination in the dot model and the values corresponding to the peripheral positions for which dot formation has already been determined in the dot model; finding the dot model corresponding to the case where the absolute value of the first sum value is lowest; calculating a second sum value by adding together the image signal at the dot formation position under examination, the effects from already determined dots on the periphery of the dot formation position under examination, and the error distributed according to an error diffusion method from the already formed peripheral dots to the dot formation position under examination; comparing the lowest absolute value of the first sum values with the absolute value of the second sum value; determining that a dot is to be formed at the dot formation position under examination and storing a quantization result corresponding to the dot model corresponding to the lowest absolute value, if the lowest absolute value of the first sum values is greater than the absolute value of the second sum value; calculating the effect on the peripheral pixels caused by forming a dot at the dot formation position under examination, if it is determined that a dot is to be formed, according to the dot model corresponding to the lowest value, and calculating the error distributed to the peripheral pixels by multiplying a previously established error diffusion coefficient by the lowest value; and determining that a dot is not to be formed at the dot formation position under examination, storing a quantization result corresponding to a case where no dot is formed, and calculating the error distributed to the peripheral pixels by multiplying the error diffusion coefficient by the second sum value, if the lowest absolute value of the first sum values is not greater than the absolute value of the second sum value.

Furthermore, desirably, the image processing method comprises the steps of: setting an array indicating the sequence of dot formation positions for which it is to be determined whether or not to form a dot by a dot formation device, at the pixel positions on the recording medium; setting dot models for each dot formation position on the recording medium, each dot model containing information relating to at least one of the dot shape, dot density, dot position, and presence or absence of a satellite, of the dot formed on the recording medium, as determined on the basis of at least one of the dot formation characteristics of the dot formation device corresponding to the dot formation position and the fixing characteristics of the recording medium; reading out a dot formation position to be examined, in accordance with the array; reading out a plurality of dot models corresponding to the dot formation position under examination; calculating a third sum value for each dot model of the plurality of dot models read out, the third sum value being the sum of the value obtained by adding together the image signal at the dot formation position under examination, the effects from already determined dots on the periphery of the dot formation position under examination, and the error distributed to the dot formation position under examination from already formed peripheral dots, according to an error diffusion method, plus the value corresponding to the dot formation position under examination in the dot model, or plus the value corresponding to the dot formation position under examination in the dot model and the values corresponding to the unprocessed pixel positions on the periphery of the dot formation position under examination; finding the dot model corresponding to the case where the absolute value of the third sum values is lowest; calculating a fourth sum value obtained by adding together the image signal at the dot formation position under examination, the effects from already determined dots on the periphery of the dot formation position under examination, and the error distributed by the error diffusion method from the already formed peripheral dots into the dot formation position under examination; comparing the lowest absolute value of the third sum values with the absolute value of the fourth sum value; determining that a dot is to be formed at the dot formation position under examination and storing a quantization result corresponding to the dot model corresponding to the lowest absolute value, if the lowest absolute value of the third sum values is greater than the absolute value of the fourth sum value; calculating the effect on the unprocessed peripheral pixel position caused by forming a dot at the dot formation position under examination, if it is determined that a dot is to be formed, according to the dot model corresponding to the lowest value, and calculating the error distributed to the unprocessed peripheral pixel positions by multiplying a previously established error diffusion coefficient corresponding to the unprocessed peripheral pixel positions, by the lowest value; and determining that a dot is not to be formed at the dot formation position under examination, storing a quantization result corresponding to a case where no dot is formed, and calculating the error distributed to the unprocessed peripheral pixel positions by multiplying the error diffusion coefficient corresponding to the unprocessed peripheral pixel positions by the fourth sum value, if the lowest absolute value of the third sum values is not greater than the absolute value of the fourth sum value.

As described above, according to an image processing method, an image processing apparatus, and the image forming apparatus comprising an image processing apparatus, of the present invention, a dot array is determined in accordance with the dot formation characteristics of the dot formation device (for example, the ejection characteristics of the nozzles), and thereby it is possible to suppress image defects caused by the characteristics of the dot formation device and to achieve suitable dot formation with respect to recording media of different fixing characteristics on the basis of a dot model corresponding to the recording medium.

BRIEF DESCRIPTION OF THE DRAWINGS

The nature of this invention, as well as other objects and advantages thereof, will be explained in the following with reference to the accompanying drawings, wherein:

FIGS. 7A to 7G are illustrative diagrams showing examples of dot models used in the present invention;

FIG. 12 is an illustrative diagram showing an example of an error diffusion coefficient;

Figure 14:
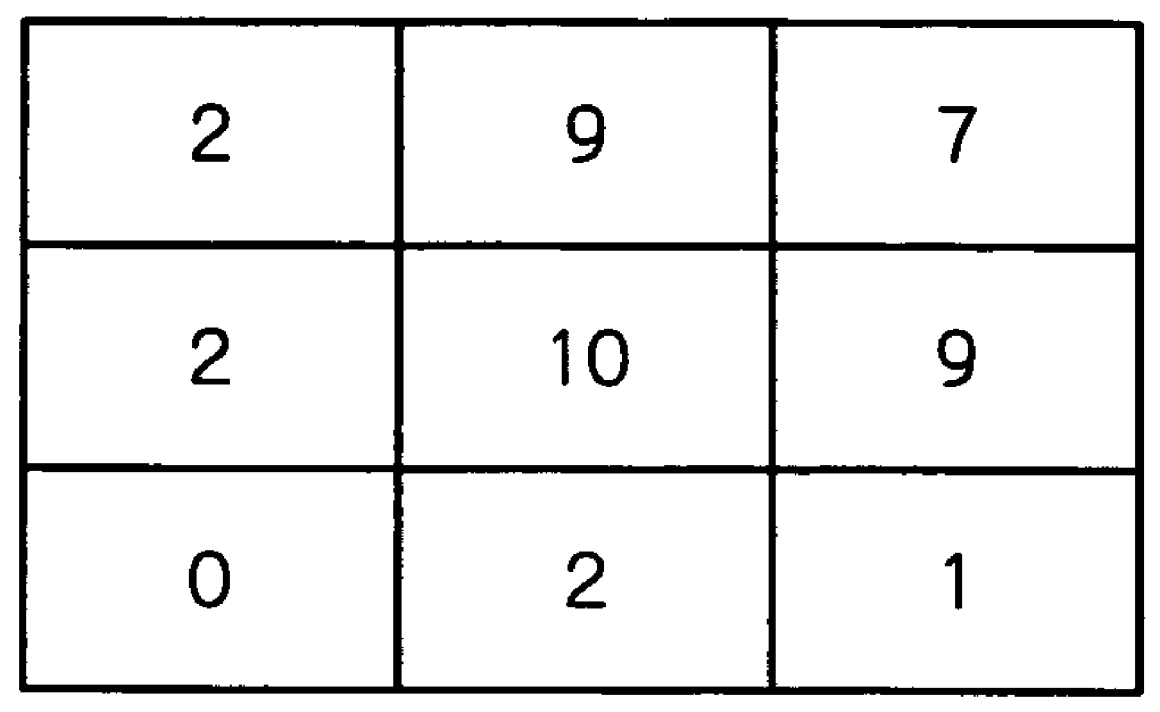

FIG. 14 is an illustrative diagram showing a concrete example of a dot model used in the second embodiment;

DETAILED DESCRIPTION OF THE PREFERRED EMBODIMENTS

Figure 1:
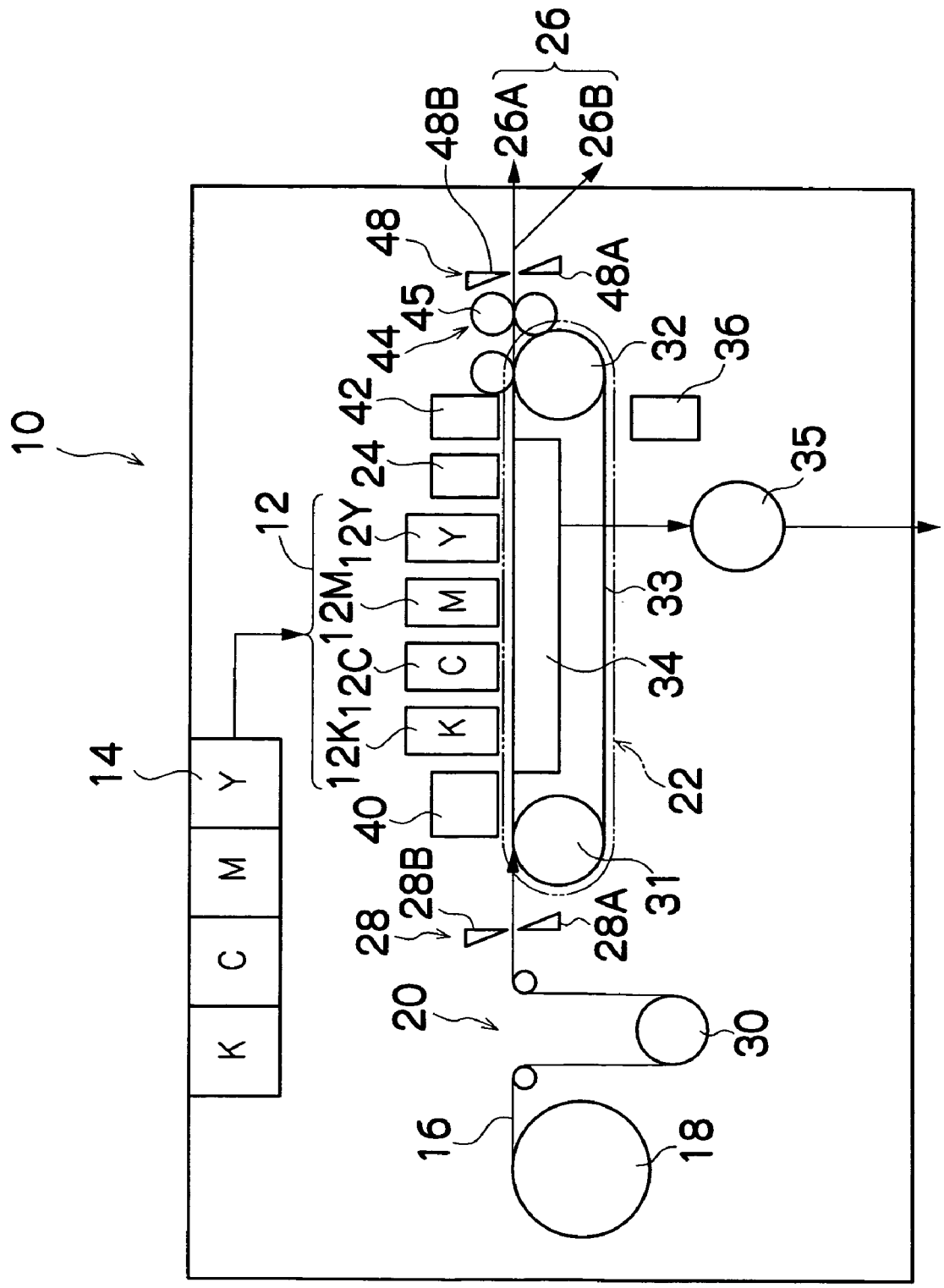
FIG. 1 is a general schematic drawing of one embodiment of an inkjet recording apparatus as an image forming apparatus according to the present invention.

FIG. 1 is a general schematic drawing of an inkjet recording apparatus as one embodiment of an image recording apparatus according to the present invention.

As shown in FIG. 1, the inkjet recording apparatus 10 comprises: a printing unit 12 having a plurality of print heads 12K, 12C, 12M, and 12Y for ink colors of black (K), cyan (C), magenta (M), and yellow (Y), respectively; an ink storing and loading unit 14 for storing inks of K, C, M and Y to be supplied to the print heads 12K, 12C, 12M, and 12Y; a paper supply unit 18 for supplying recording paper 16; a decurling unit 20 for removing curl in the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which roll paper is used, a cutter 28 is provided as shown in FIG. 1, and the roll paper is cut to a desired size by the cutter 28. The cutter 28 has a stationary blade 28A, whose length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyance path. When cut paper is used, the cutter 28 is not required.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1. The suction chamber 34 provides suction with a fan 35 to generate a negative pressure, and the recording paper 16 on the belt 33 is held by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

The print unit 12 is a so-called full-line head (see FIG. 2) having a length corresponding to the full width of the recording paper 16, and includes print heads 12K, 12C, 12M and 12Y corresponding to the four colors (black (K), cyan (C), magenta (M) and yellow (Y)), each of the print heads 12K, 12C, 12M, and 12Y having a plurality of ejection ports (nozzles) and being arranged in such a manner that the lengthwise direction of the print heads 12K, 12C, 12M, and 12Y is aligned with the breadthways direction of the recording paper 16 (the main scanning direction) which is perpendicular to the conveyance direction of the paper (the sub-scanning direction).

Figure 2:
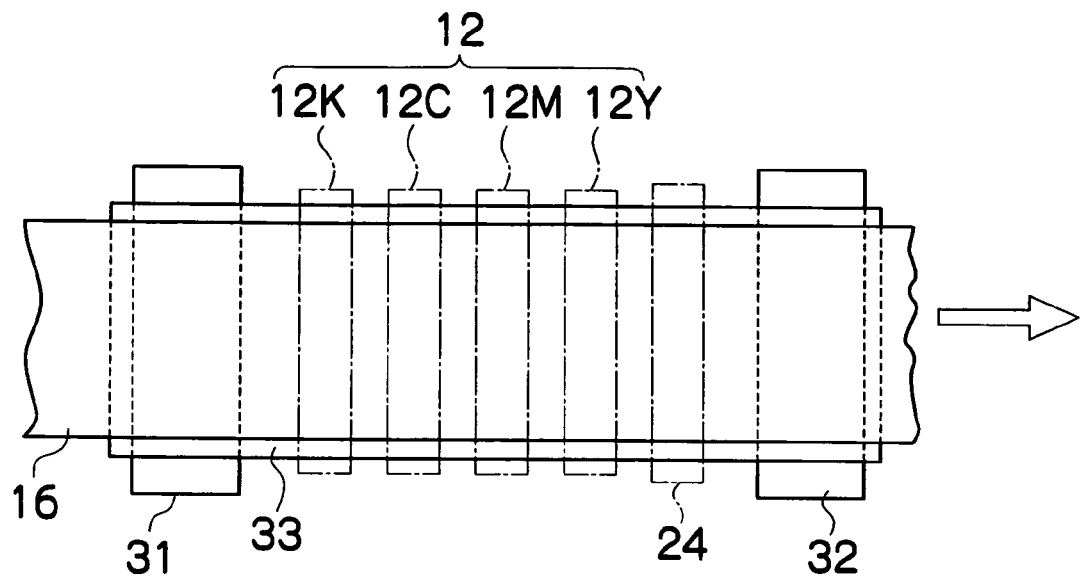
FIG. 2 is a plan view of the principal part of the peripheral area of a print unit in the inkjet recording apparatus illustrated in FIG. 1.

As shown in FIG. 2, the print heads 12K, 12C, 12M and 12Y are constituted by line heads in which a plurality of ink ejection ports (nozzles) are arranged in the lengthwise direction of the head through a length exceeding at least one side of the maximum size recording paper 16 intended for use with the inkjet recording apparatus 10.

The print heads 12K, 12C, 12M, and 12Y are arranged in the order of black (K), cyan (C), magenta (M), and yellow (Y) from the upstream side (left side in FIG. 2), along the conveyance direction of the recording paper 16 (the paper conveyance direction, indicated by the arrow in FIG. 2). A color image can be formed on the recording paper 16 by ejecting the inks from the print heads 12K, 12C, 12M, and 12Y, respectively, onto the recording paper 16 while conveying the recording paper 16.

The print unit 12, in which the full-line heads covering the entire width of the paper are thus provided for the respective ink colors, can record an image over the entire surface of the recording paper 16 by performing the action of moving the recording paper 16 and the print unit 12 relative to each other in the paper conveyance direction just once (in other words, by means of a single scan). Higher-speed printing is thereby made possible and productivity can be improved in comparison with a shuttle type head configuration in which a print head moves reciprocally in the direction that is perpendicular to paper conveyance direction.

Although the configuration with the KCMY four standard colors is described in the present example, combinations of the ink colors and the number of colors are not limited to those. Light inks or dark inks can be added as required. For example, a configuration is possible in which print heads for ejecting light-colored inks such as light cyan and light magenta are added.

As shown in FIG. 1, the ink storing and loading unit 14 has ink tanks for storing the inks of the colors corresponding to the respective print heads 12K, 12C, 12M, and 12Y, and the respective tanks are connected to the print heads 12K, 12C, 12M, and 12Y by means of channels (not shown). The ink storing and loading unit 14 has a warning device (for example, a display device, an alarm sound generator, or the like) for warning when the remaining amount of any ink is low, and has a mechanism for preventing loading errors among the colors.

The print determination unit 24 has an image sensor (line sensor and the like) for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

The print determination unit 24 reads a test pattern image printed by the print heads 12K, 12C, 12M, and 12Y for the respective colors, and determines the ejection state of each print head 12K, 12C, 12M and 12Y. The determination of the ejection state includes the presence of the ejection, measurement of the dot size, and measurement of the dot deposition position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in the drawings, the paper output unit 26A for the target prints is provided with a sorter for collecting prints according to print orders.

The present embodiment is described with respect to an example where the print heads 12K, 12C, 12M and 12Y are full line type heads in which a plurality of ink ejection ports (nozzles) are arranged through a length exceeding at least one edge of the maximum size of recording paper 16 that is intended for use with the inkjet recording apparatus 10, as shown in FIG. 2, but it is also possible to achieve a length corresponding to the full width of the recording medium by joining together short heads each having a two-dimensional arrangement, in a staggered matrix configuration, although this is not shown in the drawings.

Next, the structure of a print head will be described. The print heads 12K, 12C, 12M and 12Y provided for the respective ink colors have the same structure, and one print head 50 is described as a representative example of these print heads.

Figure 3:
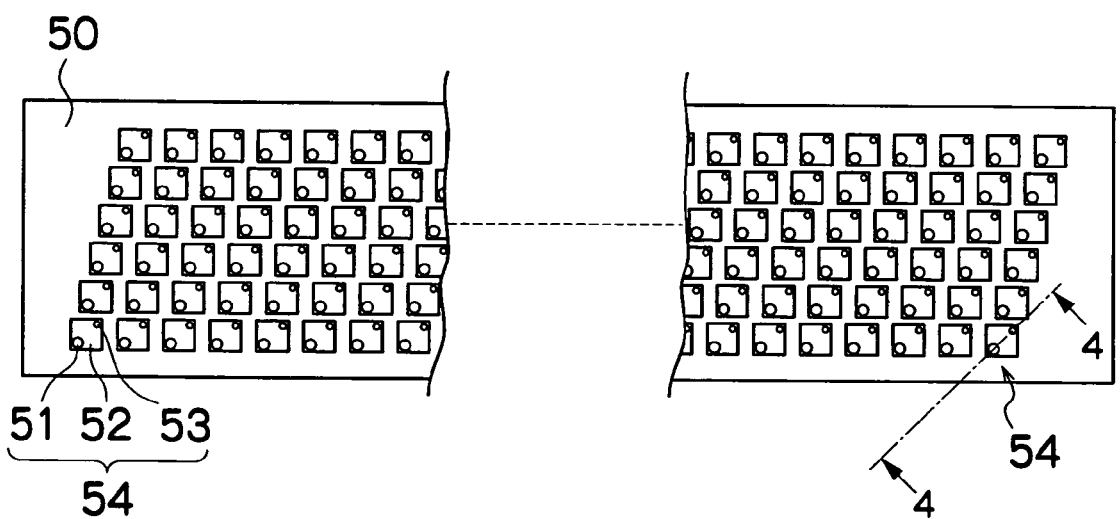
FIG. 3 is a plan perspective diagram showing an example of the structure of a print head.

FIG. 3 is a plan perspective diagram showing an example of the structure of a print head 50. As shown in FIG. 3, the print head 50 according to the present example achieves a high density arrangement of the apparent nozzle pitch of the nozzles 51 by using a two-dimensional staggered matrix array of a plurality of pressure chamber units 54, each constituted by a nozzle 51 for ejecting ink as ink droplets, a pressure chamber 52 for applying pressure to the ink in order to eject ink, and an ink supply port 53 for supplying ink to the pressure chamber 52 from a common flow channel (not illustrated).

As shown in FIG. 3, each pressure chamber 52 has an approximately square planar shape when viewed from above, and a nozzle 51 is formed at one end of a diagonal of the chamber, while an ink supply port 53 is provided at the other end thereof. The pressure chambers 52 are connected to a common ink flow channel (not illustrated) via ink supply ports 53. The ink is supplied to the pressure chambers 52 from the common flow channel via the ink supply ports 53, and the pressure chambers 52 are caused to deform by the pressure applied by actuators (piezoelectric elements) (not illustrated), or the like, in such a manner that ink is ejected from the nozzles 51 to the recording paper.

Figure 4:
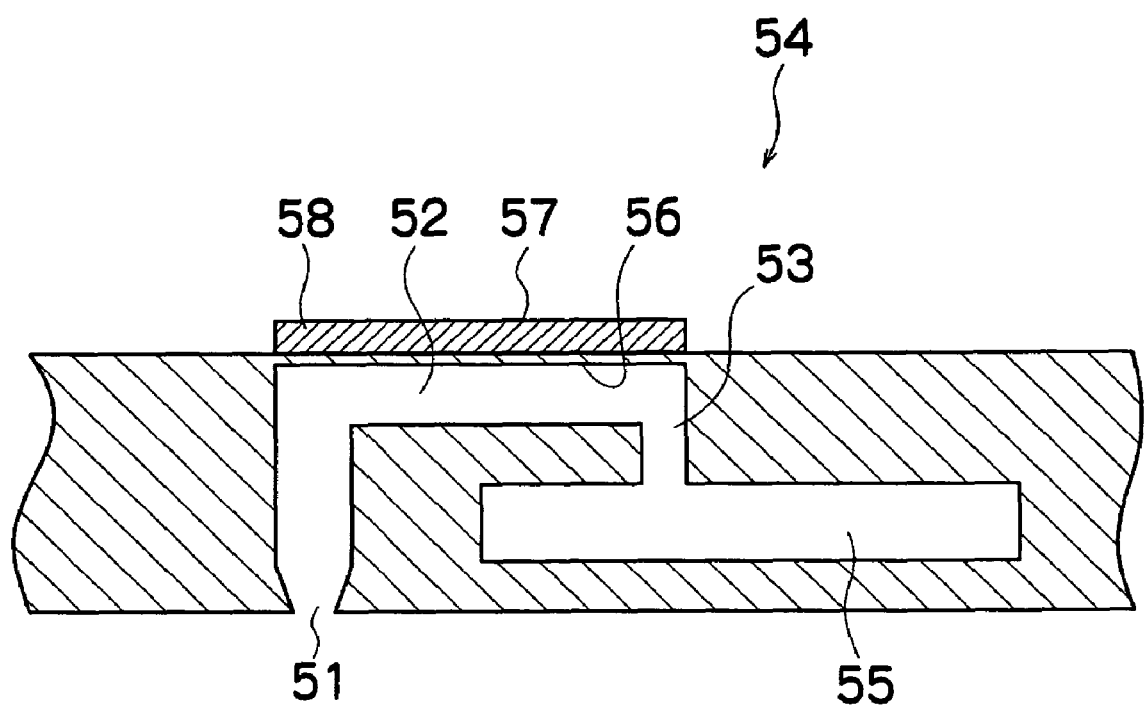
FIG. 4 shows a cross-sectional view of one pressure chamber unit along line 4-4 in FIG. 3.

Furthermore, FIG. 4 shows a cross-sectional view of a pressure chamber 54 along the single-dotted line 4-4 in FIG. 3.

As shown in FIG. 4, in each of the respective pressure chamber units 54, the upper surface of the pressure chamber 52 is formed by a diaphragm 56, and a piezoelectric element 58 is formed on top of the diaphragm 56. Moreover, an individual electrode 57 is formed on the piezoelectric element 58. Furthermore, the diaphragm 56 also serves as a common electrode, and by applying a drive voltage to the common electrode (diaphragm 56) and an individual electrode 57, the piezoelectric element 58 deforms, the diaphragm 56 distorts, and the volume of the pressure chamber 52 is reduced, in such a manner that ink is ejected from the nozzle 51. After ejecting ink, new ink is supplied to the pressure chamber 52 from the common flow channel 55 through the ink supply port 53.

Figure 5:
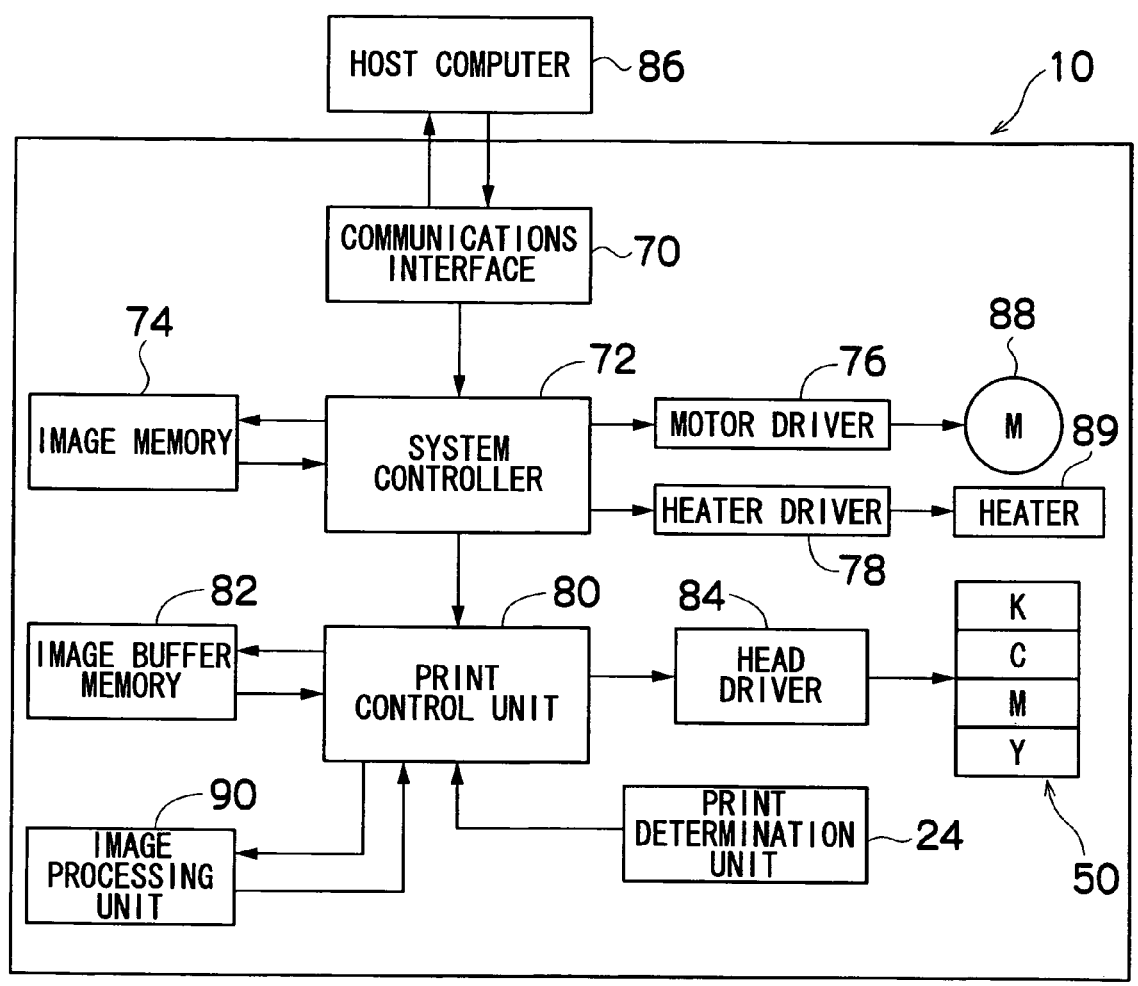
FIG. 5 is a principal block diagram showing the system composition of the inkjet recording apparatus.

FIG. 5 is a principal block diagram showing the system configuration of the inkjet recording apparatus 10 of the present embodiment. The inkjet recording apparatus 10 comprises a communication interface 70, a system controller 72, an image memory 74, a motor driver 76, a heater driver 78, a print controller 80, an image buffer memory 82, a head driver 84, and the like.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is a control unit for controlling the various sections, such as the communication interface 70, the image memory 74, the motor driver 76, the heater driver 78, and the like. The system controller 72 is constituted by a central processing unit (CPU) and peripheral circuits thereof, and the like, and in addition to controlling communications with the host computer 86 and controlling reading and writing from and to the image memory 74, or the like, it also generates a control signal for controlling the motor 88 of the conveyance system and the heater 89.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to supply the generated print a control signal (print data) to the head driver 84. Prescribed signal processing is carried out in the print controller 80, and the ejection amount and the ejection timing of the ink droplets from the respective print heads 50 are controlled via the head driver 84, on the basis of the print data.

The print controller 80 is provided with the image buffer memory 82; and image data, parameters, and other data are temporarily stored in the image buffer memory 82 when image data is processed in the print controller 80. The aspect shown in FIG. 5 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives the piezoelectric element 58 of the print heads of the respective colors 12K, 12C, 12M and 12Y on the basis of print data supplied by the print controller 80. The head driver 84 can be provided with a feedback control system for maintaining constant drive conditions for the print heads.

Furthermore, in the present embodiment, in addition to the composition described above, the inkjet recording apparatus 10 has an image processing unit 90 forming an image processing apparatus which converts the image data into dot arrangement data according to a halftoning technique based on the effects of various errors which can arise when dots are formed.

In FIG. 5, the image processing unit 90 is depicted as a separate device from the system control 72 and the print controller 80, for the sake of convenience; however, the image processing unit 90 may be incorporated in the system controller 72 or the print controller 80, for example, forming a portion of same.

As described in detail below, the image processing unit 90 converts the input image data into dot arrangement data with the use of a halftoning technique based on the effects of various errors which necessarily occur when dots are formed. Thereby, a high-quality dot arrangement and a desired dot size and dot arrangement are achieved.

Figure 6:
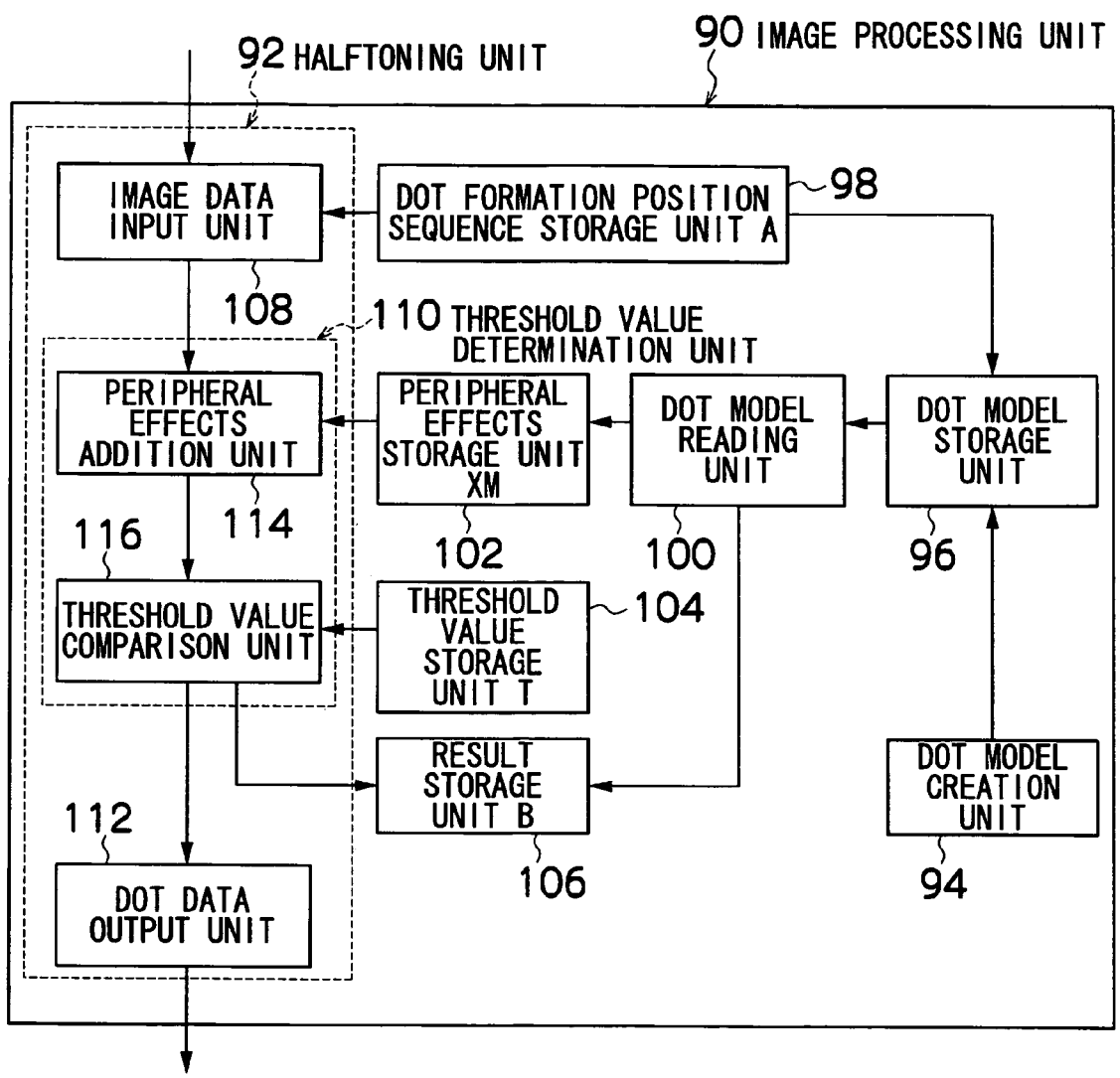
FIG. 6 is a block diagram showing the general composition of an image processing unit relating to a first embodiment of the present invention.

FIG. 6 is a block diagram illustrating the approximate composition of the image processing unit 90. As shown in FIG. 6, the image processing unit 90 principally comprises a halftoning unit 92, a dot model creation unit 94, and a dot model storage unit 96.

Furthermore, the image processing unit 90 also comprises a dot formation position sequence storage unit 98, a dot model reading unit 100, a peripheral effects storage unit 102, a threshold value storage unit 104, a result storage unit 106, and the like.

The halftoning unit 92 performs digital halftoning of the input image data, by determining whether to form dots by using a dot model or not, and thereby dot arrangement data is created on the basis of the input image data.

Furthermore, in order to carry out this processing, the halftoning unit 92 comprises an image data input unit 108, a threshold value determination unit 110, and a dot data output unit 112. The threshold value determination unit 110 comprises a peripheral effect addition unit 114 and a threshold value comparison unit 116. The peripheral effect addition unit 114 does addition of effect quantity of the nozzle ejection characteristics from the peripheral dot formation positions or of fixing characteristics of recording medium, which is previously determined, with the use of a dot model. Furthermore, the threshold value comparison unit 116 compares this added value with a threshold value previously set in the threshold value storage unit 104, and creates dot arrangement data by determining the presence or absence of dot formation at the position currently under consideration. The dot arrangement data thus created is output to the dot data output unit 112.

The dot model creation unit 94 creates a dot model. Here, a "dot model" contains information including the dot shape, dot size, dot position, dot density, absence/presence of a satellite, and the like. The dot model is determined on the basis of the nozzle ejection characteristics or the fixing characteristics of the recording medium. Furthermore, the dot model storage unit 96 stores the created dot model. The presence and absence of dot formation at each of the dot formation positions is determined by using the dot model.

Furthermore, the dot formation position sequence storage unit 98 is a section (memory) which stores an array A indicating a sequence of positions on the recording medium (dot formation position sequence) in which it is determined whether to form a dot or not.

The dot model reading unit 100 stores dot models. Each of the dot models corresponds to each of the positions on the recording medium and is selected from data in the dot model storage unit 96, for use in determining dot formation.

Furthermore, the peripheral effect storage unit 102 stores data corresponding to the effects from the peripheral dot formation positions which have already been determined and which are to be added to the image data for the position in question. The threshold value storage unit 104 stores threshold values (a threshold value matrix) for use in determining dot formation with respect to each of the positions. Furthermore, the result storage unit 106 stores quantization results corresponding to the dot models used in order to determine dot formation at each of the positions.

Next, a description is given of a dot model which represents the dot formation state with respect to each dot formation position, which is determined on the basis of the ejection characteristics (dot formation characteristics) of the nozzles (dot forming devices) or the fixing characteristics of the recording medium. As described above, the dot model provides information including the dot shape, dot size, dot position, dot density, presence/absence of a satellite, and the like. In order to determine the presence or absence of dot formation, the dot model is converted into numerical values (quantized), and rasterized data (dot image) is used.

FIGS. 7A to 7G show examples of the dot models. The dot models contain information relating to the dot formation state with respect to each of the dot formation positions, such as the dot shape, dot position error, dot size error, and presence/absence of a satellite, and the shape of a satellite if the satellite is present.

Firstly, as shown in FIG. 7A, a 3×3 pixel matrix (mesh) comprising a pixel representing a dot formation position, and 8 surrounding pixels, for example, is considered. As shown in FIG. 7A, each pixel of the 3×3 pixel matrix is indicated by a set of column numbers and row numbers, 11 to 33, the set starting with the column number (which is the reverse of a normal row/column representation). Consequently, the set of numbers, ij, indicates a position in column i and row j. Below, these numbers are omitted from the drawings, but the pixel positions can be specified by means of this set of numbers.

The size of the dot model is not limited to a 3×3 size in this way, and any size may be used. Furthermore, the dot formation position is not limited to the center of the mesh as in the example described above, and information on the correlation between the dot model and the dot formation position (x row, y column) corresponding to same may be provided.

FIG. 7B shows one conceptual model of a dot model for the dot formation position (22). In the drawing, a circle indicated by a solid line represents the position at which the dot is actually formed, and the actual dot shape. Furthermore, FIG. 7C shows an example of a dot model having a positional error in which the actual dot formation position is shifted upward and rightward from the originally intended dot formation position (22). Moreover, FIG. 7D shows an example of a dot model having an error in respect of the dot formation position, the dot size and the dot shape. In this way, the size of the dot actually formed is larger than the mesh (lattice) interval which is demarcated on the basis of the respective dot formation positions, and furthermore, the position of the dot actually formed is shifted from the original dot formation position. The dot model represents this dot size and positional error.

Moreover, FIG. 7E shows an example of a dot model where a satellite is present. Furthermore, FIG. 7F shows an example of a case in which a finer mesh is formed with respect to the pixels surrounding the dot formation position (22), compared to the example in FIG. 7E.

For each of the pixels (mesh squares) in the dot models shown in FIGS. 7B to 7F, the values are determined on the basis of the dot density and/or the surface area of the overlap between the pixels and the dot. For instance, FIG. 7G shows an example in which numerical conversion is conducted with respect to the dot model having positional error illustrated in FIG. 7C.

In FIG. 76, if dot density is represented by D, then the value at the dot formation position (22) forming the central pixel position is D, and the values of the surrounding pixels (mesh) are expressed in FIG. 7G on the basis of the surface area of the overlap with the dot. In other words, as described above, if the pixel ij represents a pixel in column i and row j in a 3×3 pixel matrix, then pixel 11 is a pixel of 0.1D, pixel 12 is 0.2D, pixel 13 is 0.0D, pixel 21 is 0.9D, pixel 23 is 0.2D, pixel 31 is 0.6D, pixel 32 is 0.8D, and pixel 33 is 0.1D. In this way, numerical conversion (quantization) is carried out with respect to the dot model, and the data is rasterized and used in determining dot formation.

When ink is actually ejected from a nozzle onto the recording medium, the dot position, dot shape, and the like, are determined on the basis of the characteristics of the recording medium and the nozzle ejection characteristics. If, for example, the recording medium has characteristics which make ink bleeding liable to occur, then the ink may bleed, spread broadly, and hence the dot shape may be disrupted. In this way, the actual dot model is determined on the basis of the nozzle ejection characteristics and the fixing characteristics of the recording medium.

The dot model is created by the dot model creation unit 94, by actually ejecting and forming a dot from the nozzle onto the recording medium, measuring the dot, and then converting the data thus obtained into numerical values as shown in FIG. 7G Alternatively, it is also possible to form a prescribed number of dots by one nozzle, perform statistical processing for calculating the average value of the dot shapes, for example, and then to create a dot model on the basis of the results of this processing.

Furthermore, if a dot model is created by measuring ejected and formed dots, then the dots formed on the recording medium may be measured by the print determination unit 24 described above, for example. In the dot model creation unit 94, the image region is divided into a prescribed number of mesh squares on the basis of this measurement data; a dot model is created for each of the dot formation positions, on the basis of the position, shape, and the like, of the dots at each dot formation position; and then numerical conversion of the dot model is carried out. Moreover, there is a one-to-one correspondence between the dot formation positions and the nozzles which form dots at these positions, and a dot model based on the nozzle ejection characteristics and the fixing characteristics of the recording medium is created in advance for each nozzle and stored in the dot model storage unit 96.

For example, it is also possible to store previously created dot model data in the dot model storage unit 96 when the product is dispatched. Furthermore, it is also possible to create dot models by forming and measuring dots again, after the apparatus has started operation. Moreover, it is not limited to one dot model for each dot formation position of each nozzle; in cases where there are a plurality of types of recording medium, or cases where the nozzles are able to eject dots of a plurality of different sizes, then it is also possible to create a plurality of dot models for each dot formation position of each nozzle.

Next, a method of forming dots in an image processing method according to a first embodiment of the present invention will be described.

Figure 8:
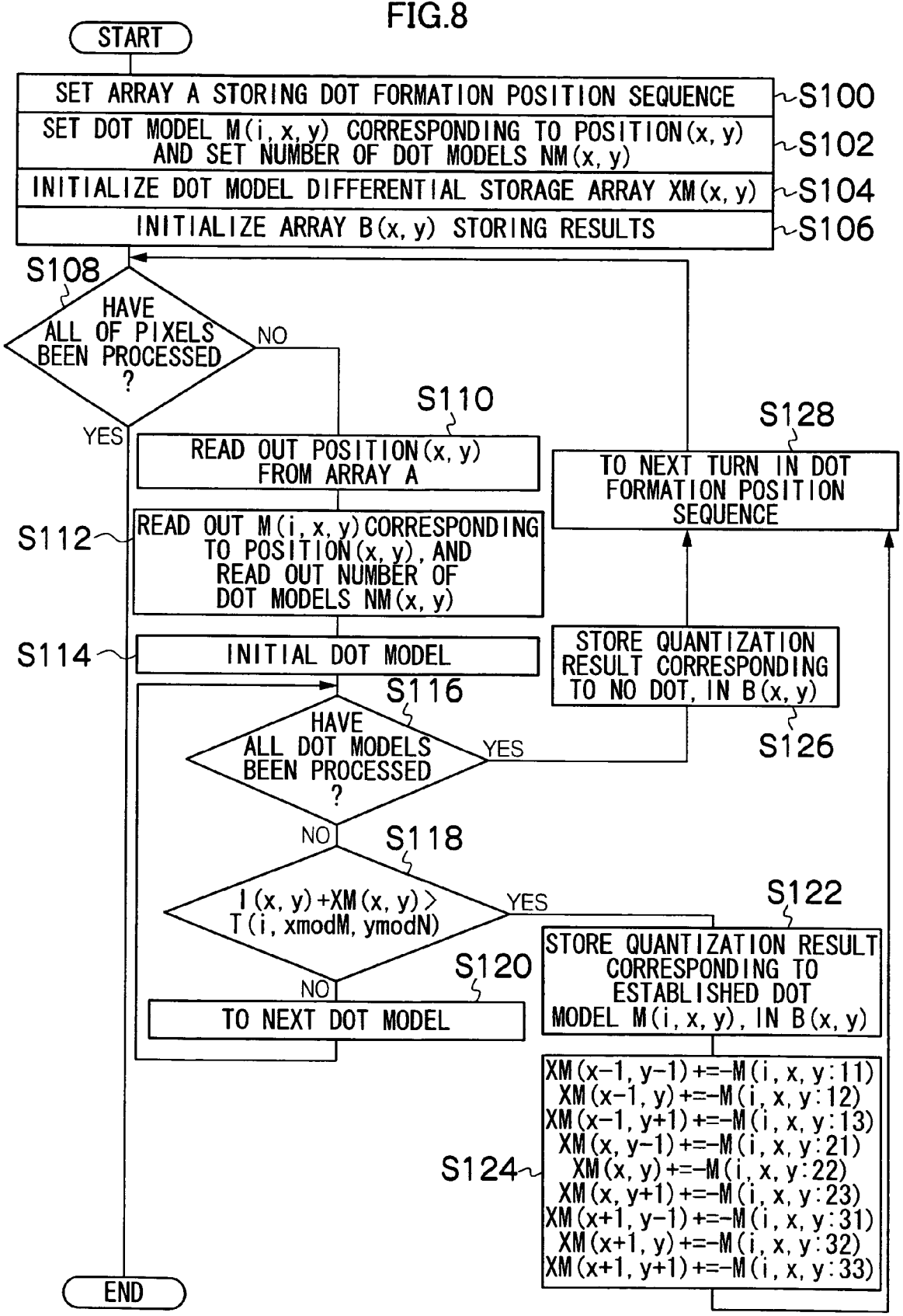
FIG. 8 is a flowchart showing a dot formation method according to the first embodiment of the present invention.

FIG. 8 shows a flowchart of a dot formation method in an information processing method according to a first embodiment. According to the present embodiment, halftoning process is carried out by determining the formation of dots at the dot formation positions according to a threshold value matrix with the use of the dot model described above, and thereby a high-quality image is obtained.

More specifically, in the dot formation method according to the present embodiment, in forming an image by forming dots on a recording medium, it is determined whether to form a dot at a position (x, y) on the recording medium or not, by comparing the image signal (which may be a density value) I(x, y) at that position (x, y) with a prescribed threshold value T(x, y), in accordance with a sequence (dot formation position sequence) for determining whether to form a dot at each position (x, y) or not.

The image formation region on the recording medium is divided into square areas (grid), and coordinates indicating the square areas are provided. For example, if the top left-hand corner of the image formation region is set as a point of origin, then the position of a grid square (pixel) at a position x squares in the rightward direction and y squares in the downward direction, is expressed as (x, y). This position (x, y) indicates a dot formation position. The size of the dot that is actually formed is larger the size of one grid square, and if, for example, dots are formed in such a manner that the center of the dot is situated at the dot formation positions (x, y), then a solid image without any gaps can be obtained.

Below, the dot formation method according to the present embodiment is described with reference to the flowchart in FIG. 8.

Firstly, in step S100 in FIG. 8, an array A is established, which indicates the dot formation position sequence, namely, the sequence in which a determination is to be made on whether to form a dot at the positions (x, y) on the recording medium or not. There is no particular restriction on this dot formation position sequence (array A), and it may be a raster sequence in which the processes are executed in order, from the top row to the down row, or from left to right in each row, in terms of the rows of positions in the image formation region. Moreover, dot formation position sequence (array A) may be the sequence based on prescribed rules, or a random sequence. In any case, this sequence is provided by the array A. Furthermore, as in the case of a raster sequence, especially in cases where the sequence is clearly determined in a similar fashion to normal image processing, it is possible to omit the dot formation position sequence storage unit (array A) 98.

Next, at step S102, a dot model M(i, x, y) corresponding to the position (x, y) is read out from the dot model storage unit 96 and established. As stated previously, the dot model indicates the size (projection) and positional error of the dot formed at the dot formation position (x, y) with respect to the dot formation position itself, and M(i, x, y) is a variable obtained by converting these factors into numerical values.

Furthermore, in cases where there are a plurality of dot models for each position (x, y), the index i here is used for indicating a particular dot model. Furthermore, the number NM(x, y) of the dot models established for the position (x, y) is also set. For example, if the number of dot models for the position (x, y) is NM(x, y)=n, then the index i corresponding to this represents i=1, 2, . . . , n.

Next, at step S104, the dot model differential storage array XM(x, y) in the peripheral effects storage unit 102 which stores data corresponding to the effects from the peripheral dot formation positions that have already been determined and that is to be added to the image signal I(x, y) of the image data recorded at position (x, y), is initialized. Furthermore at step S106, the array B(x, y) of the result storage unit 106 which stores the dot model used for determining dot formation, is initialized.

After these preparatory steps, the procedure transfers to the determination of dot formation for each of the pixel positions (x, y).

Next, at step S108, it is determined whether there are any pixels that have not yet been processed. If there are still pixels to be processed (in other words, there are any pixels that have not yet been processed), then the procedure advances to step S110, and the data of the position (x, y) for which dot formation is to be determined is extracted from the array A indicating the dot formation position sequence, which is previously established as described above.

Thereupon, at step S112, the dot models M(i, x, y) corresponding to the position (x, y) are extracted from the plurality of dot models M(i, x, y) previously established, and furthermore, the number of dot models NM(x, y) corresponding to this position (x, y) is extracted.

Next, at step S114, the first dot model is extracted, and dot formation is then determined with the use of this dot model, as described below.

Firstly, at step S116, it is determined whether processing has been completed for all of the dot models or not, in other words, it is determined if there is a dot model remaining. In the case of the processing of the first dot model, since a dot model(s) still remains, the procedure advances to step S118, and dot formation is determined.

More specifically, the sum of the image signal I(x, y) at position (x, y) and already determined XM(x, y) corresponding to the effect from the peripheral dot formation positions, namely, I(x, y)+XM(x, y), is compared with the component T(i, x(mod M), y(mod M)) corresponding to the position (x, y) in a previously established threshold value matrix T of size M×N. Here, x(mod M) represents the remainder of dividing x by M, and y(mod N) represents the remainder of dividing y by N. The reason for adopting this method is that, since the size M×N of the threshold value matrix T is generally smaller than the number of the pixels of the image formation region, then the threshold value matrix T is used repeatedly for the positions (x, y) within the image formation region, and the component corresponding to the position (x, y) in the threshold value matrix T is extracted.

Furthermore, if the position (x, y) is the first position in the sequence in which dot formation is to be determined, then since there are not yet any peripheral dot formation positions which have already been determined, the value of XM(x, y) that is added to I(x, y) is 0.

In the above comparison, if the sum of I(x, y)+XM(x, y) does not exceed the threshold value T(i, x(mod M), y(mod M)), in other words, if the following inequality (1):

$$I(x, y)+XM(x, y)>T(i, x(\mathrm{mod}M), y(\mathrm{mod}N)) \qquad (1)$$

is not established, then the procedure advances to step S1120, and the index i of the dot model M(i, x, y) is incremented by 1, whereupon the procedure returns to step S116 and a similar comparison with the threshold value is made with the use of the next dot model.

Furthermore, in the comparison at step S118, if the inequality (1) is established, in other words, if I(x, y)+XM(x, y) exceeds the threshold value T(i, x(mod M), y(mod N)), then it is determined to form a dot at position (x, y), and the procedure then advances to step S1122.

At step S122, the quantization result corresponding to the dot model M(i, x, y) used to determine dot formation is reflected and stored in the array B(x, y) of the result storage unit 106.

Furthermore, at the next step, S124, the data corresponding to the effects on the peripheral positions with respect to the position (x, y) is added (as negative values, in other words, they are subtracted from same), in accordance with the dot model M(i, x, y) currently used for determining dot formation.

The specific procedure is as follows. In the following equation, M(x, y; ij) indicates the ij component in a dot model having a 3×3 mesh as shown in FIGS. 7A to 7G For example, if the dot model corresponding to the position (x, y) is as shown in the example in FIG. 7G, then the value of M(x, y; 11) is 0.1D. Therefore, when a droplet is ejected to form a dot at position (x, y) according to the dot model in FIG. 7G, ink having a density of 0.1D is also ejected onto the position (11), and hence this amount M(i, x, y; 11) is subtracted. The same applies to other positions. Therefore, calculation is then made on the basis of the following equations:

$$XM(x-1, y-1)=XM(x-1, y-1)-M(i, x, y; 11);$$

$$XM(x-1, y)=XM(x-1, y)-M(i, x, y; 12);$$

$$XM(x-1, y+1)=XM(x-1, y+1)-M(i, x, y; 13);$$

$$XM(x, y-1)=XM(x, y-1)-M(i, x, y; 21);$$

$$XM(x, y)=XM(x, y)-M(i, x, y; 22);$$

$$XM(x, y+1)=XM(x, y+1)-M(i, x, y; 23);$$

$$XM(x+1, y-1)=XM(x+1, y-1)-M(i, x, y; 31);$$

$$XM(x+1, y)=XM(x+1, y)-M(i, x, y; 32); \text{ and}$$

$$XM(x+1, y+1)=XM(x+1, y+1)-M(i, x, y; 33).$$

In the above equations, the expression $$XM(x-1, y-1)=XM(x-1, y-1)-M(i, x, y; 11)$$

does not represent a normal mathematical equation, but rather it means that a new value of XM(x−1, y−1) is found by introducing the result of subtracting M(i, x, y; 11) from the XM(x−1, y−1) element on the right-hand side, as the XM(x−1, y−1) element on the left-hand side. The same applies to the other equations.

In FIG. 8, for example, the equation $$XM(x-1, y-1)=XM(x-1, y-1)-M(i, x, y; 11)$$

is simplified and expressed as $$XM(x-1, y-1)+=-M(i, x, y; 11).$$

The same applies to the other expressions.

Next, at step S128, the procedure advances to the next dot formation position, according to the dot formation position sequence established in the array A which indicates the order in which dot formation is to be determined for the positions (x, y). Then, the procedure returns to step S108, and similar processing is carried out for this next dot formation position. Furthermore, in the determination at step S116, if there is no remaining dot model which should be used for determination, then at step S126, a quantization result corresponding to the dot model M(i, x, y) which specifies that no dot is to be formed at position (x, y), is reflected and stored in the array B(x, y) indicating the results. The procedure then advances to step S128 where the dot formation position is advanced to the next position in the sequence, and it then returns to step S108. The processing is carried out in this way, and when it is determined at step S108 that there are no pixels that have not yet been processed, then the whole processing sequence terminates.

In this way, dot formation is determined for each position (x, y), in sequence, according to the array A which indicates the order of dot formation positions, and the presence or absence of a dot, and the dot to be formed, at each position (x, y), is determined on the basis of a dot model which takes account of the nozzle ejection characteristics and the fixing characteristics of the recording medium. Thereby, a halftoning process is carried out and a high-quality image is formed.

As described above, if a dot is formed at a dot formation position (x, y), then the densities in the peripheral positions (11, 21, 31, 12, 32, 12, 23, 33) in the dot model M(i, x, y) are taken as effect amounts for the unprocessed positions in the range considered in the dot model centered on position (x, y), and these densities are added respectively to the effects XM(x, y) from the peripheral dot formation positions (as negative values, in other words, they are subtracted from same).

Since the effects on the unprocessed peripheral positions are calculated in this way, a distributed sequence is more desirable for the determination sequence (dot formation position sequence) than a raster sequence. As for a distributed sequence, it is possible to use a sequence from smaller to larger threshold values in a threshold value matrix having blue noise characteristics.

Provided that the threshold value matrix T(i, x, y) has blue noise characteristics, then, in order to reduce the storage volume, it is also possible to use the threshold value matrix T(i, x, y) to determine the sequence, according to the values in the threshold value matrix T(i, x, y) sequentially, from the larger value to the smaller value, from the smaller value to the larger value, or the like.

In the example described above, a 3×3 mesh dot model is used, but the mesh size is not limited to being a 3×3 size. For example, if a 5×5 or a 7×7 mesh is used instead of the 3×3 mesh, then it is possible to carry out similar processing, simply by increasing the range of calculation. Moreover, in general, similar processing can be carried out, if an n×n size mesh is used.

In the first embodiment described above, in another example of determining dot formation at each dot formation position on the basis of a threshold value matrix with the use of dot models, it is also possible to handle multiple sizes of dots. In the case of dots of multiple sizes, it is determined whether a dot can be formed according to a prescribed dot size sequence or not, and the data of the effects on the peripheral positions may be calculated in accordance with the dot size at which it is determined that a dot is to be formed.

Moreover, if it is determined that a dot is not to be formed, then determination is carried out again at the next dot size, and if it is determined that a dot is not to be formed at any of the dot sizes in this way, then it is determined that no dot of any size is to be formed at this dot formation position. Desirably, the threshold value matrix in this case is set for each dot size separately.

Next, a method of forming dots in an image processing method according to a second embodiment of the present invention will be described.

In the second embodiment, dot formation is determined according to an error diffusion method on the basis of dot models such as those described above. In the present embodiment, the determination of dot formation is carried out in a raster sequence. Moreover, the determination of dot formation in the present embodiment is performed by comparing the result of the image density value I(x, y) at the dot formation position, minus the error E(x, y) and the effect XM(x, y) from the peripheral positions, with the threshold value T(x, y).

Figure 9:
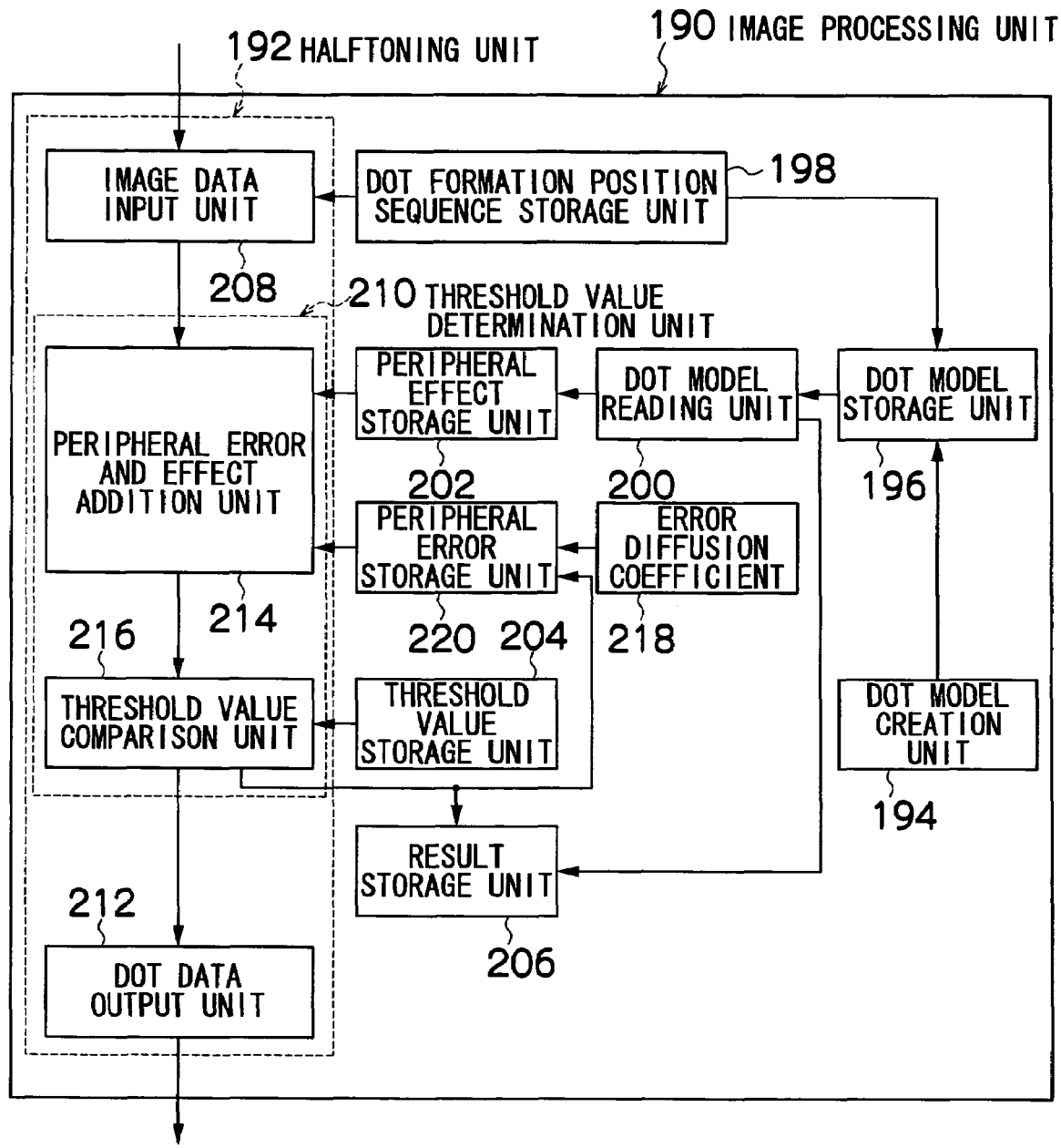
FIG. 9 is a block diagram showing the general composition of an image processing unit according to a second embodiment of the present invention.

FIG. 9 is a block diagram showing the approximate composition of an image processing unit forming an image processing apparatus according to the second embodiment. As shown in FIG. 9, the composition of the image processing unit 190 according to the present embodiment is substantially the same as the composition of the image processing unit 90 according to the first embodiment described above.

More specifically, in FIG. 9, the image processing unit 190 principally includes a halftoning unit 192, a dot model creation unit 194, a dot model storage unit 196, a dot formation position sequence storage unit 198, a dot model reading unit 200, a peripheral effect storage unit 202, a threshold value storage unit 204, a result storage unit 206, and the like. Furthermore, the halftoning unit 192 includes an image data input unit 208, a threshold value determination unit 210, and a dot data output unit 212. In the present embodiment, since the dot formation determination sequence is a raster sequence and the sequence is clearly determined, the dot formation position sequence storage unit 198 is not required necessarily.

The present embodiment differs from the first embodiment described above in respect of the fact that, not only the effects XM(x, y) from the peripheral positions, but also the errors E(x, y) from the peripheral positions, are added to the image data I(x, y), with the use of an error diffusion method when dot formation is determined.

Therefore, the threshold value determination unit 210 of the present embodiment includes a peripheral error and effect addition unit 214 and a threshold value comparison unit 216, and furthermore, the image processing unit 190 includes an error diffusion coefficient storage unit 218 and a peripheral error storage unit 220.

Here, the error E(x, y) from the peripheral positions stored in the peripheral error storage unit 220 comprises 8 values of the circumstance, centered on the dot formation position (x, y), similarly to the effects XM(x, y) from the peripheral positions, for example. Furthermore, the error diffusion coefficient EC(x, y) stored in the error diffusion coefficient storage unit 218 is an error coefficient matrix EC composed by 3×3 numerical values, which correspond to these. Although described in more detail below, when a dot is formed, the error E(x, y) from the peripheral positions is calculated on the basis of the error diffusion coefficient EC(x, y).

Figure 10:
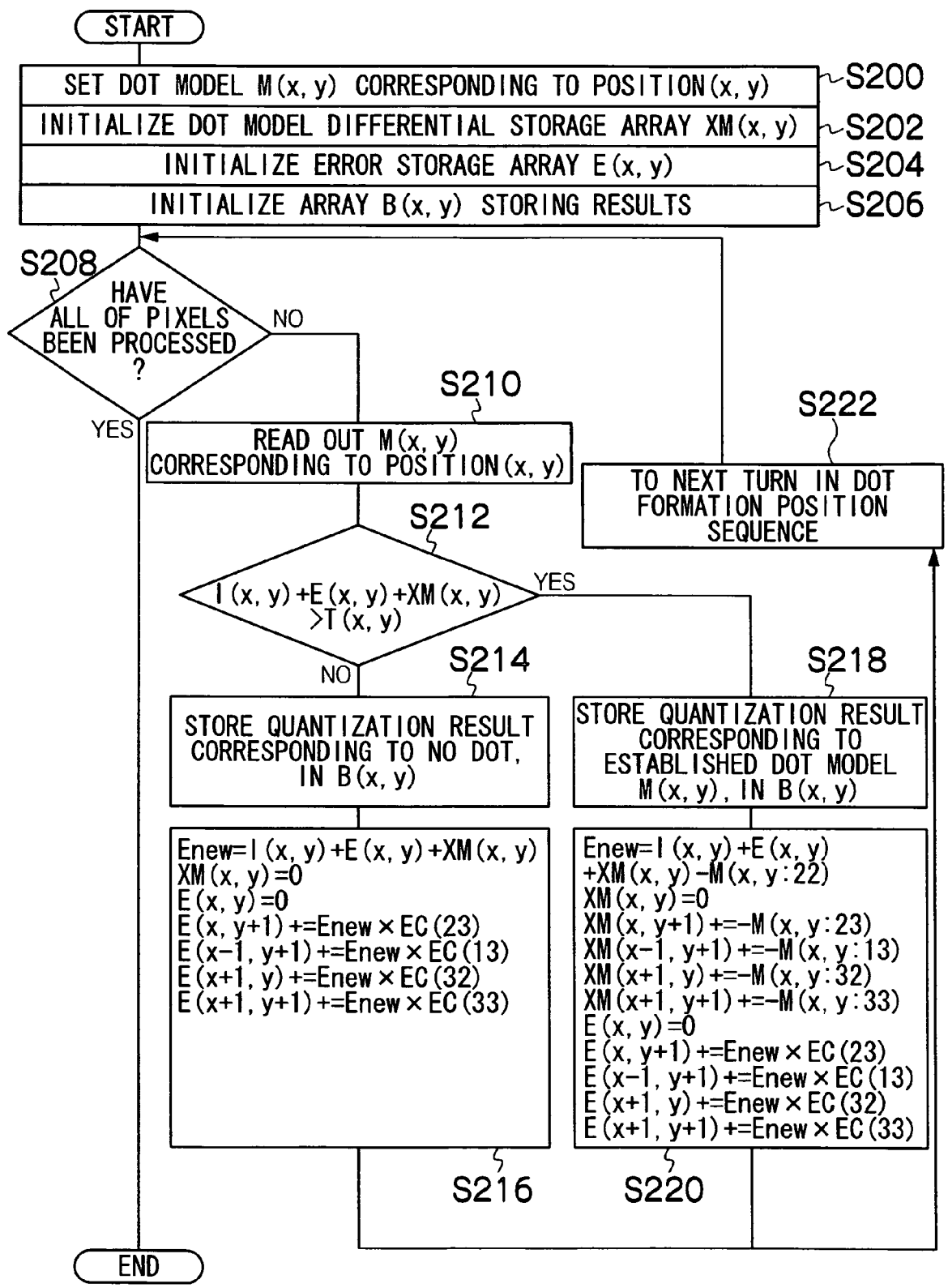
FIG. 10 is a flowchart showing a dot formation method according to the second embodiment of the present invention.

FIG. 10 is a flowchart showing a dot formation method of the image processing method according to the second embodiment, and the dot formation method of the present embodiment is described below in accordance with this flowchart.

Firstly, at step S200 in FIG. 10, a dot model M(x, y) corresponding to the position (x, y) on the recording medium is read out from the dot model storage unit 196 according to a raster sequence, and is set in the dot model reading unit 200. In the present embodiment, in contrast to the first embodiment described above, only one dot model corresponds to each position.

Next, at step S202, the dot model differential storage array XM(x, y), which corresponds to the effects from the peripheral dot formation positions that have already been determined and that should be added to the image signal I(x, y) of the image data recorded at position (x, y), is initialized.

Furthermore, at step S204, the error storage array E(x, y), which corresponds to the error from the peripheral dot formation positions which is also to be added to the image signal I(x, y), is initialized, and at the next step, S206, the array B(x, y) which stores the dot models used for determining dot formation, is initialized.

Thereafter, processing for determining dot formation at each dot formation position (x, y) is carried out. Firstly, at step S208, it is determined whether the processing has been completed for all of the pixels or not, in other words, if there are any unprocessed pixels remaining. If there are no unprocessed pixels remaining, then the process terminates. If there are still pixels which have not yet been processed, then the procedure advances to the next step S210, where the dot model M(x, y) corresponding to the position (x, y) is read out, and dot formation is then determined at step S212.

More specifically, the sum of the image signal I(x, y) at position (x, y), plus the error E(x, y) and the effects XM(x, y) from the peripheral dot formation positions which have already been determined, namely, I(x, y)+E(x, y)+XM(x, y), is compared with a previously established prescribed threshold value matrix T(x, y).

Here, if the value of I(x, y)+E(x, y)+XM(x, y) is not greater than the threshold value T(x, y), in other words, if the following inequality (2):

$$I(x, y)+E(x, y)+XM(x, y)>T(x, y) \qquad (2)$$

is not established, then at the next step, S214, it is determined that no dot is to be formed (no dot), and a quantization result corresponding to the current dot model is stored at the corresponding area B(x, y) in the result storage unit 206.

Next, at step S216, errors relating to the dot formation positions (unprocessed pixel positions) at which dot formation is to be determined from here on, is calculated, as described below. Firstly, the generated error Enew is taken to be $$Enew=I(x, y)+E(x, y)+XM(x, y).$$

Since dot formation has already been determined for position (x, y) and it has already been determined that no dot is to be formed, then both the effect XM(x, y) and the error E(x, y) are set to zero.

Furthermore, with regard to the peripheral error, as described below, an error for each dot formation position is calculated by multiplying the generated error Enew by an error diffusion coefficient EC(x, y) and conducting addition.

Figure 11:
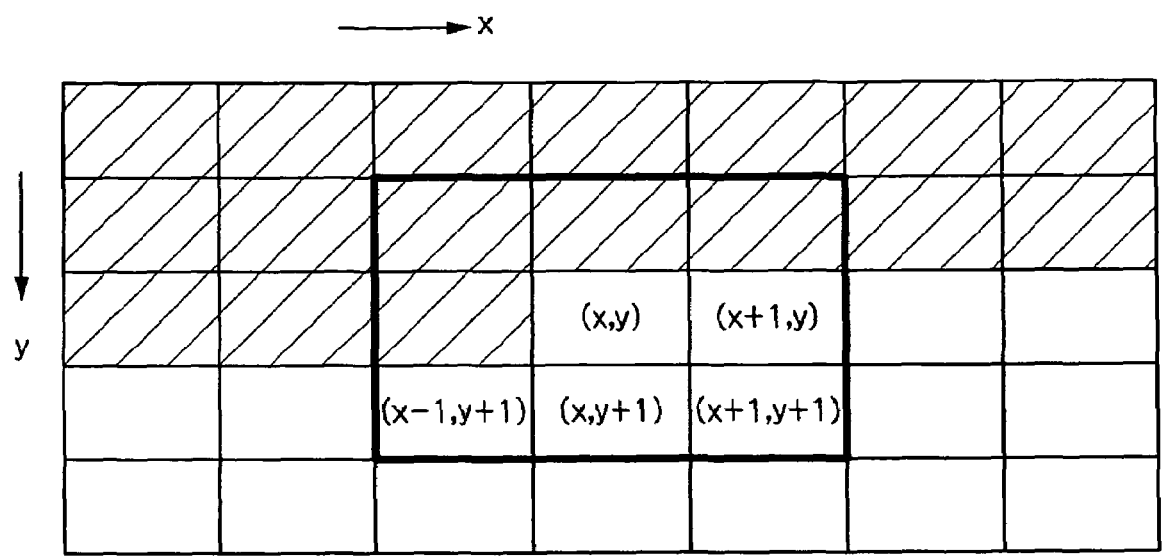
FIG. 11 is an illustrative diagram showing a dot formation method according to the second embodiment.

In the present embodiment, dot formation is determined in a raster sequence, then it is supposed that dot formation is to be determined for the position (x, y) shown in FIG. 11, for example. In FIG. 11, the diagonally shaded sections are pixels for which dot formation has already been determined. In FIG. 11, the error produced by determining dot formation at the dot formation position (x, y) is distributed, according to the error diffusion coefficient EC, to the four unprocessed pixels which are on the periphery of the position (x, y), namely, (x, y+1), (x−1, y+1), (x+1, y), (x+1, y+1).

FIG. 12 shows an error diffusion coefficient EC. The error diffusion coefficient EC is expressed as a 3×3 matrix, and the central component 22 corresponds to the dot formation position (x, y). Therefore, the new value of the error E(x, y+1) at pixel position (x, y+1) is found by carrying out adding of the product of multiplying the generated error Enew by the 23 component EC(23) at the corresponding position of the error diffusion coefficient EC, as in the following equation:

$$E(x, y+1)=E(x, y+1)+Enew \times EC(23).$$

Values for the other errors are calculated in a similar fashion, as shown below:

$$E(x-1, y+1)=E(x-1, y+1)+Enew \times EC(13);$$

$$E(x+1, y)=E(x+1, y)+Enew \times EC(32); \text{ and}$$

$$E(x+1, y+1)=E(x+1, y+1)+Enew \times EC(33).$$

Here, for example, the expression $$E(x, y+1)=E(x, y+1)+Enew \times EC(23)$$

means that a new value for E(x, y+1) is obtained by substituting the E(x, y+1) element on the left-hand side with the sum of the E(x, y+1) element on the right-hand side plus Enew×EC(23). Furthermore, in FIG. 10, this equation is simplified and depicted as $$E(x, y+1)+=Enew \times EC(23).$$

The same applies to the other expressions.

In this way, at step S216, each value is calculated, and the procedure then advances to step S222 and transfers to processing for the next pixel position.

Furthermore, at step S212, if the inequality (2) is established, then dot formation is determined for position (x, y), and at step S218, the quantization result corresponding to the dot model M(x, y) used for determining dot formation is stored in the result storage unit 206.

Next, at step S220, firstly, the generated error Enew generated by forming a dot at the dot formation position (x, y) is calculated according to the following equation:

$$Enew=I(x, y)+E(x, y)+XM(x, y)-M(x, y; 22).$$

Here, M(x, y; 22) represents the 22 component of the dot model M(x, y), and this applies similarly to the other expressions.

Moreover, data corresponding to the densities at (32, 13, 23, 33) in the dot model M(x, y) corresponding to the four unprocessed pixel positions which are on the periphery of the dot formation position (x, y), are respectively added as effect amounts to the effects XM(x, y) from the peripheral positions, and furthermore, the error caused by forming a dot at the dot formation position is distributed to the aforementioned four peripheral unprocessed pixels with the use of the error diffusion coefficient EC.

In the dot formation position (x, y), dot formation is determined, and therefore the effects XM(x, y) and the errors E(x, y) from the positions on the periphery of this position are taken to be zero, that is:

$$XM(x, y)=0; \text{ and}$$

$$E(x, y)=0.$$

Next, with regard to the four unprocessed pixel positions that are on the periphery of the dot formation position (x, y) shown in FIG. 11, namely, (x+1, y), (x−1, y+1), (x, y+1), (x+1, y+1), the effects XM and the errors E, which indicate the effects on the density caused by the dot size (projection) and positional error at the dot formation position (x, y) for which dot formation has already been determined, are calculated according to the following equations, where the way of expression of equations described above is also applied to these expressions:

$$XM(x, y+1)=XM(x, y+1)-M(x, y; 23);$$

$$XM(x-1, y+1)=XM(x-1, y+1)-M(x, y; 13);$$

$$XM(x+1, y)=XM(x+1, y)-M(x, y; 32);$$

$$XM(x+1, y+1)=XM(x+1, y+1)-M(x, y; 33);$$

$$E(x, y+1)=E(x, y+1)+Enew \times EC(23);$$

$$E(x-1, y+1)=E(x-1, y+1)+Enew \times EC(13);$$

$$E(x+1, y)=E(x+1, y)+Enew \times EC(32); \text{ and}$$

$$E(x+1, y+1)=E(x+1, y+1)+Enew \times EC(33).$$

After calculating the various values in this way at step S220, the procedure advances to step S222, moves to the next turn in the dot formation position sequence, and transfers to processing for the next position. In this way, when the processing has been completed for all of the pixels, then the image processing terminates.

The aforementioned processing is described below on the basis of a concrete example. Here, it is supposed that dot formation is determined for a central position (x, y) of the 3×3 mesh indicated by solid lines in FIG. 13. Furthermore, FIG. 14 shows the dot model corresponding to the position (x, y).

Figure 13:
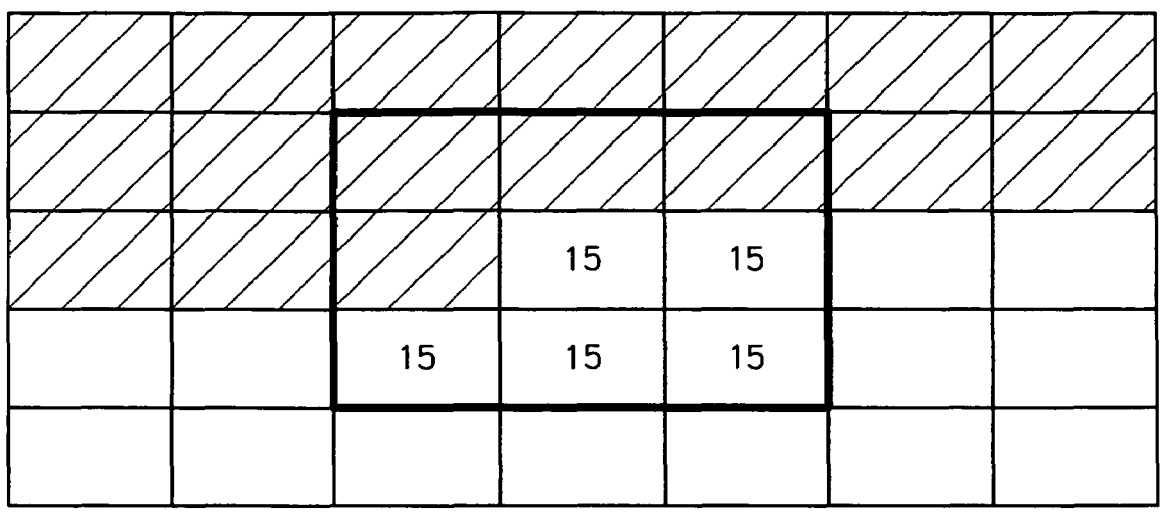
FIG. 13 is an illustrative diagram showing a concrete example of a dot formation method according to the second embodiment.

Here, it is supposed that the determination of dot formation is carried out in a raster sequence, and that processing has already been completed for the pixels in the diagonally shaded sections in FIG. 13. As shown in FIG. 13, the density value at the dot formation position (x, y) currently being processed is taken to be I(x, y)=15, and the density values of the four unprocessed pixels on the periphery of this position are also taken to be 15. Moreover, the error E(x, y) from the peripheral positions at the position (x, y) is taken to be E(x, y)=−4, and the effect XM(x, y) from the peripheral positions is taken to be XM(x, y)=−3. Furthermore, the threshold value T(x, y) for determining dot formation is taken to be T(x, y)=7. In this case, $$I(x, y)+E(x, y)+XM(x, y)=15+(-4)+(-3)=8.$$

Since the threshold value is 7, then the following inequality $$I(x, y)+E(x, y)+XM(x, y)>T(x, y)$$

is established, and therefore it is determined that a dot is to be formed at the position (x, y).

Furthermore, according to FIG. 14, since "M(x, y; 22)=10" is established, the generated error Enew is given by:

$$Enew=I(x, y)+E(x, y)+XM(x, y)-M(22)=15+(-4)+(-3)-10=-2.$$

Moreover, the effects XM and errors E from the peripheral positions are calculated respectively as described below:

$$XM(x+1, y) = XM(x+1, y) - M(x, y; 32)$$
$$= XM(x+1, y) - 9;$$

$$XM(x-1, y+1) = XM(x-1, y+1) - M(x, y; 13)$$
$$= XM(x-1, y+1) - 0;$$

$$XM(x, y+1) = XM(x, y+1) - M(x, y; 23)$$
$$= XM(x, y+1) - 2;$$

$$XM(x+1, y+1) = XM(x+1, y+1) - M(x, y; 33)$$
$$= XM(x+1, y+1) - 1;$$

$$E(x+1, y) = E(x+1, y) + Enew \times EC(32);$$

$$E(x-1, y+1) = E(x-1, y+1) + Enew \times EC(13);$$

$$E(x, y+1) = E(x, y+1) + Enew \times EC(23);$$

and $$E(x+1, y+1) = E(x+1, y+1) + Enew \times EC(33).$$

As described above, XM(x, y) and E(x, y) are zero.

Next, as one variation of the second embodiment, the dot formation method according to a third embodiment of the present invention will be described.

In this variation of the second embodiment, the effects of the already quantized positions on the dot formation position are treated as error, and this error is diffused (distributed) to the unquantized pixels. For example, in the example shown in FIG. 11, in the case of the central dot formation position (x, y) of the 3×3 mesh indicated by the thick lines, the effects on the dot formation position M(x, y) from the four previously quantized positions indicated by the shading, namely (11, 21, 31, 12), are also treated as error, and this error is diffused to the four unquantized pixels (x+1, y), (x−1, y+1), (x, y+1), (x+1, y+1).

The image processing apparatus which implements the dot formation method according to the present embodiment is similar to that in the second embodiment shown in FIG. 9 described above.

Figure 15:
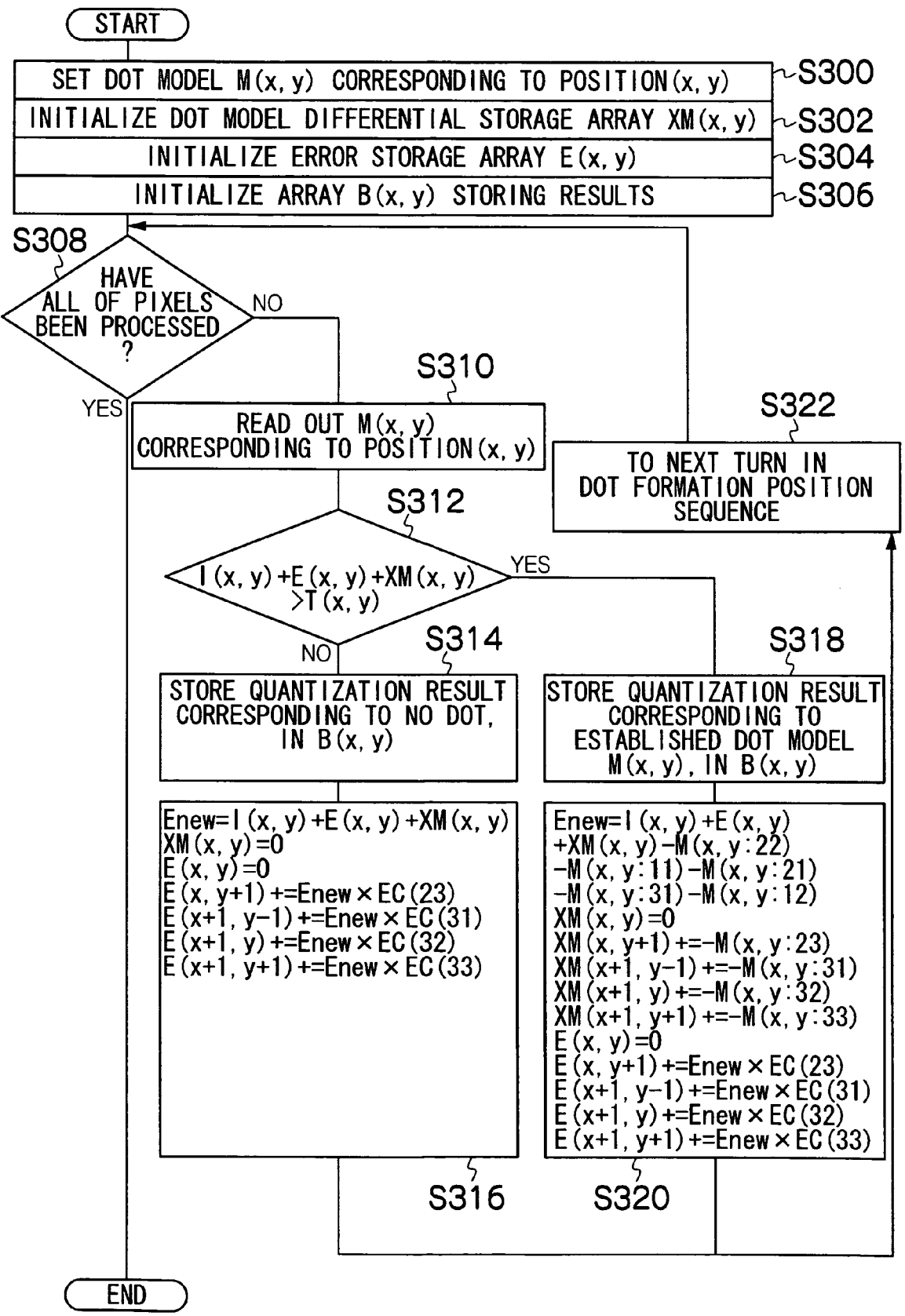
FIG. 15 is a flowchart showing a dot formation method according to a third embodiment of the present invention.

FIG. 15 is a flowchart showing the sequence of the processing of the dot formation method according to this third embodiment.

As shown in FIG. 15, the present embodiment is approximately the same as the second embodiment shown in FIG. 10. The steps whose last two digits of the step numbers in FIGS. 10 and 15 are the same, correspond to each other.

The difference of the present embodiment with respect to the second embodiment is that, in step S320, when the generated error Enew is calculated, the effects on the already quantized positions in the peripheral positions of the dot model M(x, y) are also treated as error, and this error is diffused to the unquantized pixels.

More specifically, in the case of the example shown in FIG. 11 and FIG. 12, the generated error Enew is calculated as shown in the following equation:

Enew=I(x, y)+E(x, y)+XM(x, y)−M(x, y; 22)−M(x, y; 11)−M(x, y; 21)−M(x, y; 31)−M(x, y; 12).

For example, in the case of the example shown in FIG. 13 and FIG. 14, the generated error Enew is calculated as follows:

$$Enew = I(x, y) + E(x, y) + XM(x, y) - M(22) - M(11) - M(21) -$$
$$M(31) - M(12)$$
$$= 15 + (-4) + (-3) - 10 - 2 - 9 - 7 - 2 = -22.$$

The other points are similar to the second embodiment described above, and detailed description thereof is omitted here.

Next, a fourth embodiment of the present invention will be described.

The present embodiment relates to an example on the basis of an error diffusion method, similarly to the second embodiment described above and the third embodiment, which is a variation of the second embodiment. Furthermore, in the present embodiment, the determination of dot formation is carried out according to a raster sequence.

Figure 16:
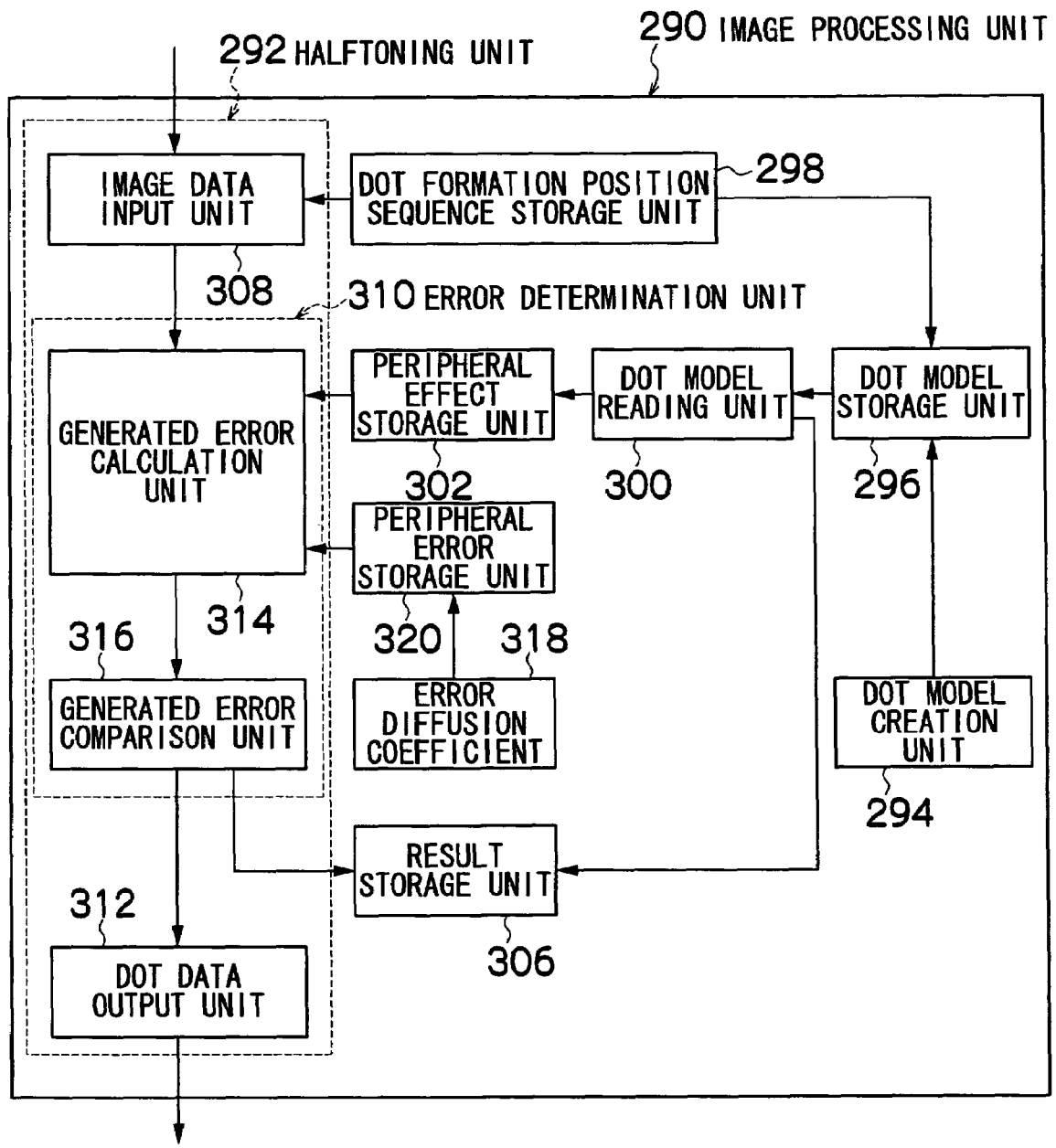
FIG. 16 is a block diagram showing the general composition of an image processing unit according to a fourth embodiment of the present invention.

FIG. 16 is a block diagram showing a general view of an image processing apparatus which implements the dot formation method according to the present embodiment.

In the present embodiment, dot formation is determined by comparing the lowest absolute value of the generated errors in all of the dot models corresponding to the dot formation position, with the absolute value of the generated error when it is determined that no dot is formed, instead of determining dot formation by comparing image data based on peripheral effects, with a threshold value, as in the embodiment(s) described above. Therefore, as shown in FIG. 16, the image processing unit 290 forming the image processing apparatus of the present embodiment includes an error determination unit 310 provided inside the halftoning unit 292, and the error determination unit 310 includes a generated error calculation unit 314 and a generated error comparison unit 316.

Although the details of the calculation method are described below, the generated error calculation unit 314 calculates the generated errors EEX(i) for all of the dot models M(i, x, y) corresponding to the dot formation position (x, y), as well as the generated error EEN if it is determined that no dot is formed.

Furthermore, the generated error comparison unit 316 determines dot formation by comparing the lowest absolute value of the generated errors EEX(i) relating to all of the dot models M(i, x, y), namely, |EEX($i_0$)|, with the absolute value of the generated error EEN when it is determined that no dot is formed, namely, |EEN|.

Furthermore, apart from the fact that no threshold value storage unit 204 is provided, the other compositional elements of the unit are substantially the same as the image processing unit 190 according to the second embodiment shown in FIG. 9, and the same last two digits are used in the reference numerals, and description of these elements is omitted here.

Figure 17:
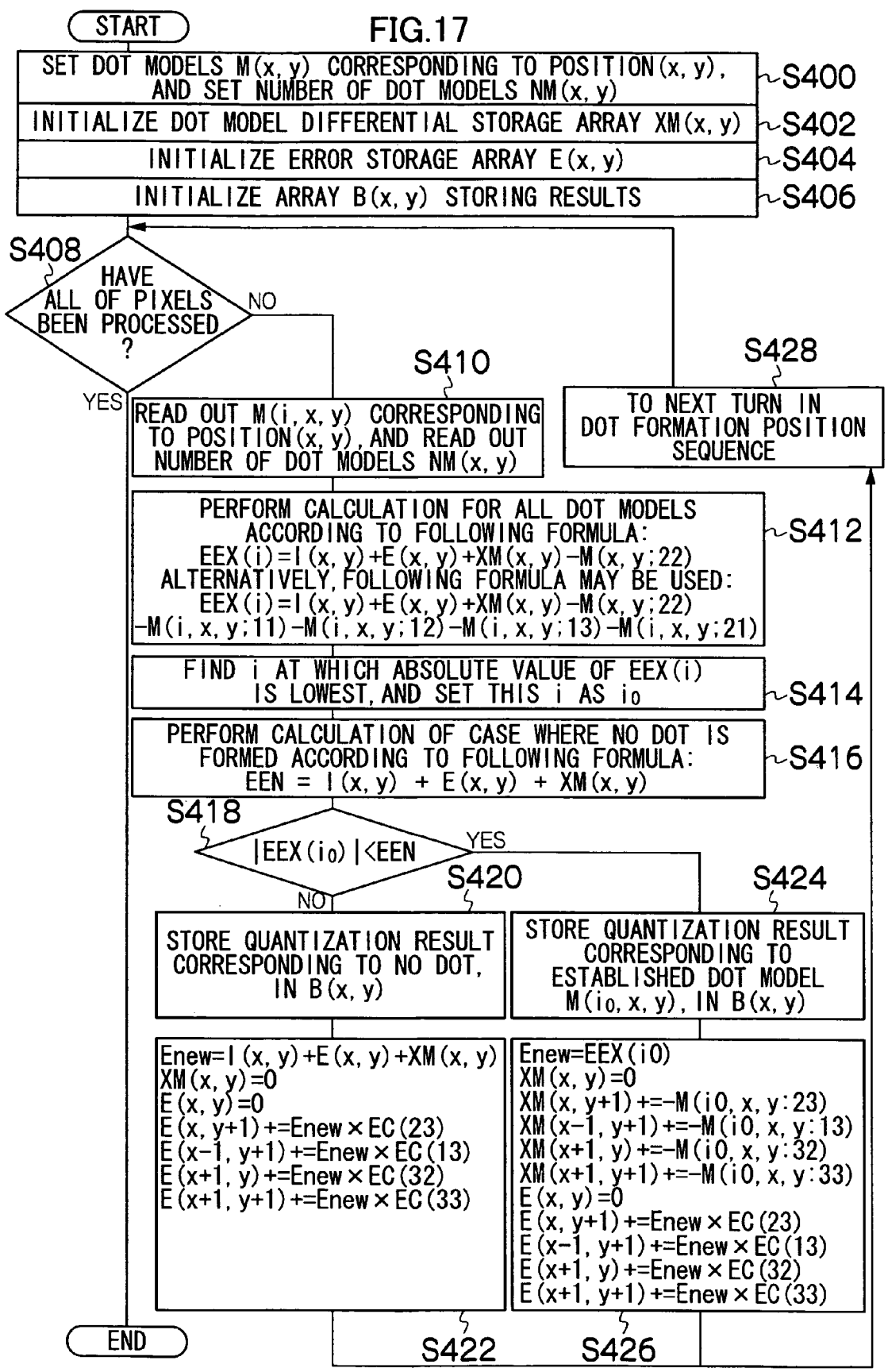
FIG. 17 is a flowchart showing a dot formation method according to the fourth embodiment of the present invention.

FIG. 17 is a flowchart showing a dot formation method according to the present embodiment.

The steps S400 to S406 in FIG. 17 are similar to the steps S300 to S306 in FIG. 15 (or the steps S200 to S206 in FIG. 10). However, in the present embodiment, there is a plurality of dot models M(i, x, y) corresponding to each position (x, y), and at step S400, the dot models M(i, x, y) corresponding to the position (x, y) are established, and the number of dot models NM(x, y) is also established.

Furthermore, the dot model differential storage array XM(x, y) is initialized at step S402, and at step S404, the error storage array E(x, y) is initialized, and at step S406, the array B(x, y) which stores the results is initialized.

Next, at step S408, it is determined whether there are still unprocessed pixels remaining or not, and if there are no unprocessed pixels remaining, then the process terminates. If, on the other hand, there still exist an unprocessed pixel, then at step S410, the dot models M(i, x, y) corresponding to the position (x, y) is read out, and the number of dot models NM(x, y) is also read out.

Next, it is determined whether to form a dot or not. The dot formation determination according to the present embodiment is based on the generated errors, and is carried out by selecting the generated error having the lowest value, instead of comparing with a threshold value as described previously. In other words, as described below, the error EEX generated when a dot model M(x, y) is formed is compared with the error EEN generated when a dot model M(x, y) is not formed. The error EEN in this case may be determined on the basis of the dot formation position only, as in the previous embodiment, and the error may be determined on the basis of the effects on the dot formation position and the already quantized pixel positions which are on the periphery of the dot formation position.

Figure 18:
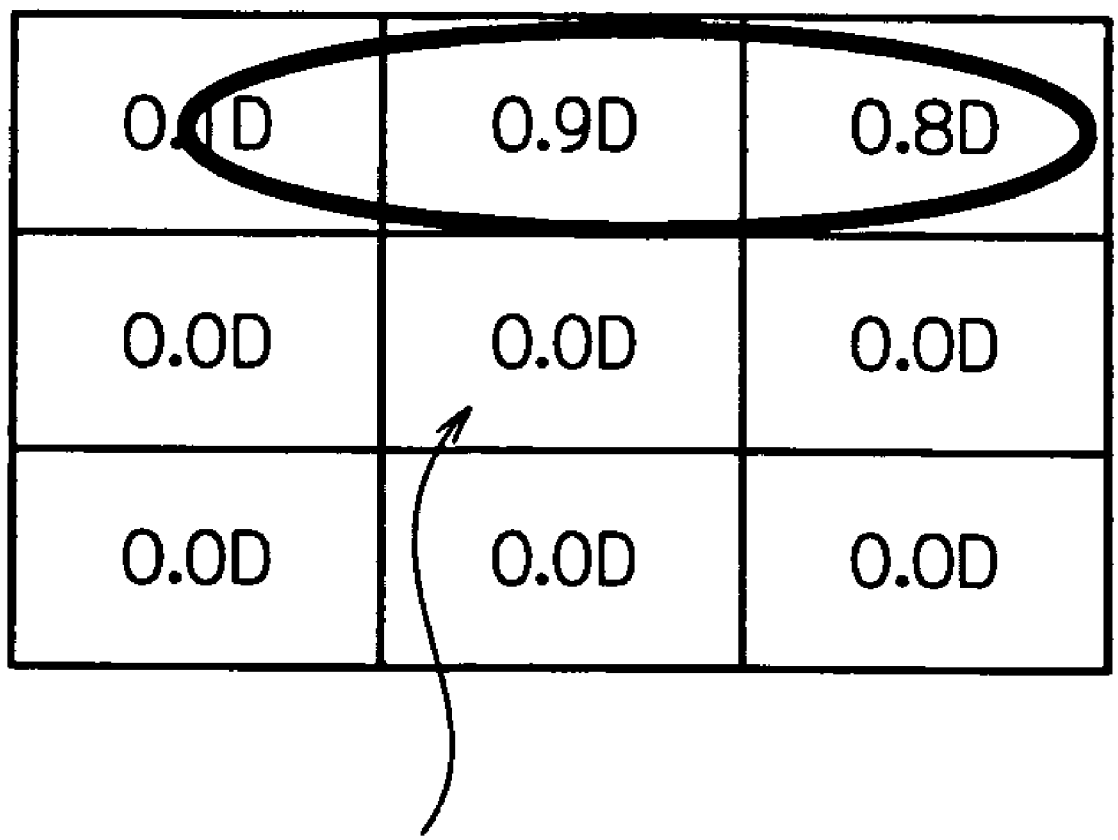
FIG. 18 is an illustrative diagram showing a concrete example of a dot model used in the fourth embodiment.

This method is especially suited to the case of a dot model in which the actual dot formation position is greatly displaced toward the upper-right side with respect to the central dot formation position, as shown in FIG. 18.

Furthermore, if a plurality of dot sizes can be formed in the case where the size is variable, or the like, then the dot models may be arranged in a prescribed sequence, such as M1, M2, M3, and so on, and of all the possible combinations, the combination producing the smallest error may be selected. While calculation is performed in the prescribed sequence, the calculation may be halted when the error becomes equal to or lower than a prescribed value.

Returning to FIG. 17, at step S412, in respect of all of the dot models, the generated errors EEX(i) when the dot models M(i, x, y) are formed are calculated on the basis of the following formula (3) or (4):

$$EEX(i)=I(x, y)+E(x, y)+XM(x, y)-M(i, x, y; 22); \text{ or} \quad (3)$$

$$EEX(i)=I(x, y)+E(x, y)+XM(x, y)-M(i, x, y; 22)M(i, x, y; 11)-M(i, x, y; 12)-M(i, x, y; 31)-M(i, x, y; 21). \quad (4)$$

Next, at step S414, the number i of the dot model M(i, x, y) producing the lowest absolute value of the generated error EEX(i) amongst the dot models M(i, x, y) is found, and this number i is taken to be $i_0$.

Thereupon, at step S416, the generated error EEN in a case where no dot is formed is calculated on the basis of the following formula (5):

$$EEN=I(x, y)+E(x, y)+XM(x, y). \quad (5)$$

Next, at step S418, dot formation is determined by comparing the lowest absolute value of the generated errors EEX(i), namely, $|EEX(i_0)|$, with the absolute value of the generated error EEN, namely, $|EEN|$.

More specifically, if the inequality $|EEX(i_0)|<|EEN|$ is not established, then it is determined that a dot is not to be formed at the position (x, y), and at the next step S420, determination indicating that no dot is to be formed (no dot) is stored in the corresponding area B(x, y) in the result storage unit 206.

Thereupon, at step S422, similarly to step S216 in FIG. 10, various values are calculated and the procedure advances to step S428, where it transfers to processing for the next dot formation position according to the dot formation position sequence.

If, on the other hand, the relationship $|EEX(i_0)|<|EEN|$ is established, then it is determined that a dot is to be formed at the position (x, y), and at the next step S424, the dot model M(i, x, y) thus determined is stored at the corresponding area B(x, y) in the result storage unit 206.

At the next step S426, similarly to the embodiment described above, the values of the generated error Enew, the effects XM on the peripheral positions and the errors E, are calculated according to the following formulas:

$$Enew=EEX(i_0);$$

$$XM(x, y)=0;$$

$$XM(x, y+1)=XM(x, y+1)-M(i_0, x, y; 23);$$

$$XM(x-1, y+1)=XM(x-1, y+1)-M(i_0,x, y; 13);$$

$$XM(x+1, y)=XM(x+1, y)-M(i_0, x, y; 32);$$

$$XM(x+1, y+1)=XM(x+1, y+1)-M(i_0, x, y; 33);$$

$$E(x, y)=0;$$

$$E(x, y+1)=E(x, y+1)+Enew\times EC(23);$$

$$E(x-1, y+1)=E(x-1, y+1)+Enew\times EC(13);$$

$$E(x+1, y)=E(x+1, y)+Enew\times EC(32); \text{ and}$$

$$E(x+1, y+1)=E(x+1, y+1)+Enew\times EC(33).$$

The way of expressing the various formulas and the way of depicting them in FIG. 17, are similar to those described previously.

Subsequently, the procedure advances to step S428 and moves to the next number in the dot formation position sequence, in accordance with the raster sequence, whereupon similar processing is carried out for the next dot formation position.

Next, a fifth embodiment of the present invention will be described.

This fifth embodiment also uses an error diffusion method. In the second, third and fourth embodiments which also use an error diffusion method, the sequence in which dot formation is determined is a raster sequence. In contrast, in the fifth embodiment, dot formation is determined in a distributed sequence (array A). In this case, a plurality of distribution coefficients are used selectively according to the distribution of unprocessed pixel positions in the peripheral region. The image processing apparatus which implements the dot formation method according to the present embodiment is substantially similar to that of the fourth embodiment shown in FIG. 16 described above.

Figure 19:
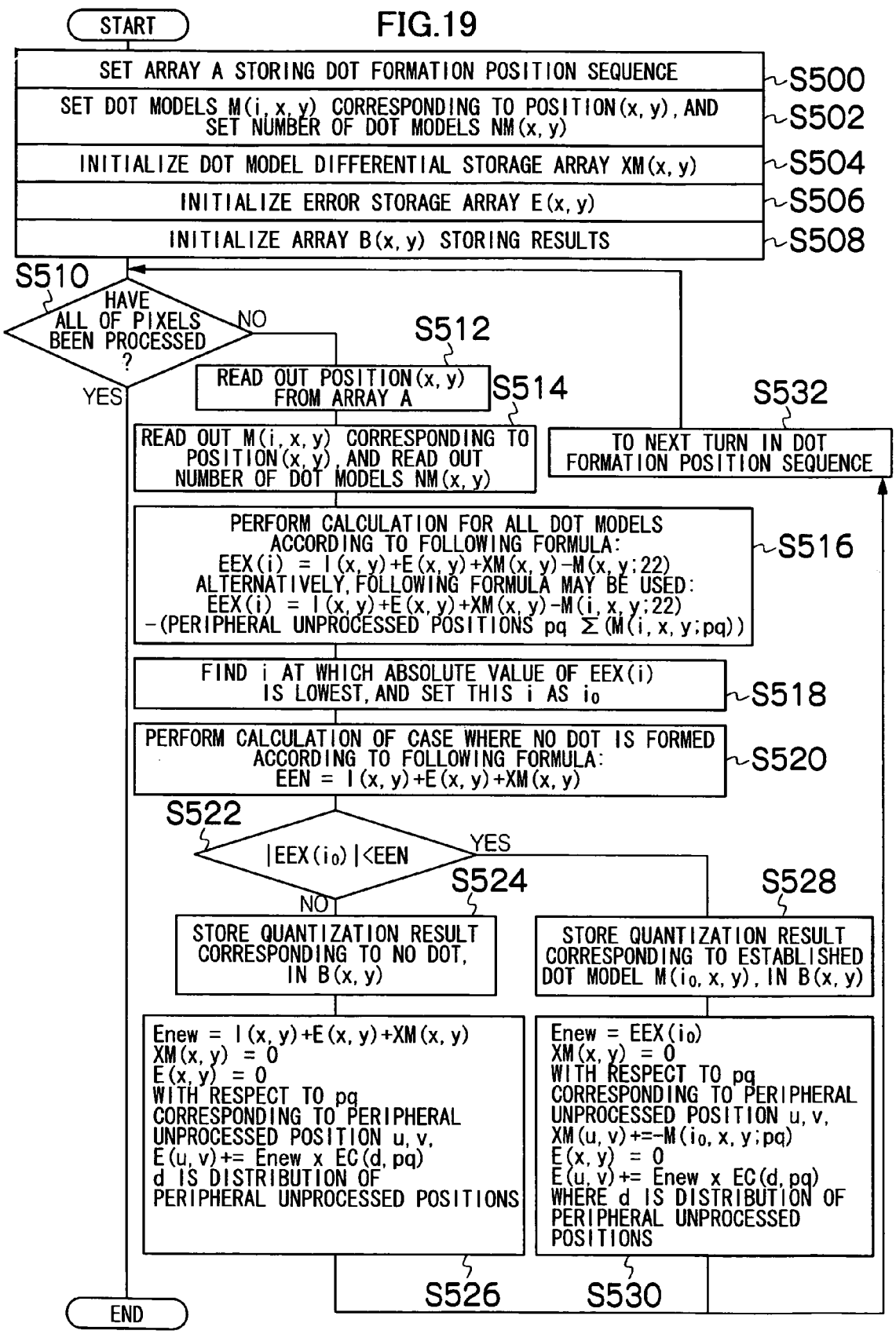
FIG. 19 is a flowchart showing a dot formation method according to a fifth embodiment of the present invention.

FIG. 19 is a flowchart showing a dot formation method according to a fifth embodiment, and the description below follows this flowchart.

Firstly, at step S500 in FIG. 19, the array A storing the dot formation position sequence is set in the dot formation position sequence storage unit 198.

Thereupon, at step S502, dot models M(i, x, y) corresponding to the position (x, y) are established, and the number of dot models NM(x, y) is also established. Furthermore, the dot model differential storage array XM(x, y) is initialized at step S504, the error storage array E(x, y) is initialized at step S506, and the array B(x, y) storing the results is initialized at step S508.

Next, at step S510, it is determined whether there are unprocessed pixels remaining or not, and if there are no unprocessed pixels remaining, then the processing terminates.

If, on the other hand, there are still pixels that have not yet been processed, then at the next step, S512, the dot formation position (x, y) is extracted from the array A, and at step S514, the dot models M(i, x, y) corresponding to the position (x, y) are read out and the number of dot models NM(x, y) corresponding to that position (x, y) is read out.

Thereafter, dot formation at the position (x, y) is determined. In the present embodiment, similarly to the fourth embodiment described above, instead of determining dot formation on the basis of comparison with a threshold value, the generated errors is observed, and determination is made depending on when the generated error has the lowest value. In other words, the error EEX generated when the dot model M(x, y) is formed is compared with the error EEN generated when the dot model M(x, y) is not formed.

However, in the fifth embodiment, in contrast to the fourth embodiment, the dot formation is determined in a sequence based on the distributed array A, rather than a raster sequence. Therefore, the calculation formulas used to calculate the generated error, and the like, are somewhat different, as shown below.

More specifically, firstly, at step S516, calculation is conducted on the basis of the following formula (6) or (7), for all of the dot models M(i, x, y) relating to position (x, y):

$$EEX(i)=I(x, y)+E(x, y)+XM(x, y)-M(x, y; 22); \text{ or} \qquad (6)$$

$$EEX(i)=I(x, y)+E(x, y)+XM(x, y)-M(x, y; 22)-\Sigma(M(i, x, y; pq)). \qquad (7)$$

Here, the sum $\Sigma$ in the formula (7) applies to the unprocessed pixel positions pq that are on the periphery of the dot formation position (x, y).

Next, at step S518, the value of i at which the absolute value of the generated error EEX(i) becomes lowest of all the dot models, is found, and this value of i is set as $i_0$.

Next, at step S520, the generated error EEN when there is no dot is calculated according to the following formula:

$$EEN=I(x, y)+E(x, y)+XM(x, y).$$

Thereupon, at step S522, dot formation is determined by comparing the lowest absolute value of the generated errors EEX when dot models are formed, $|EEX(i_0)|$, with the absolute value of the generated error EEN when no dot is formed, $|EEN|$. In other words, it is determined whether the inequality $|EEX(i_0)|<|EEN|$ is established or not.

If this inequality is not established, then it is determined that no dot is to be formed at the dot formation position (x, y), and in the next step, S524, a quantization result corresponding to "no dot" is stored in the prescribed area B(x, y) in the result storage unit 206.

At the next step, S526, various values are calculated in a similar fashion to the embodiments described above.

Firstly, the generated error Enew at the dot formation position is calculated according to the following equation:

$$Enew=I(x, y)+E(x, y)+XM(x, y).$$

Then, since dot formation has been determined for the dot formation position, the effect XM and error E at the dot formation position are cleared to zero: that is $$XM(x, y)=0; \text{ and}$$

$$E(x, y)=0.$$

Furthermore, with regard to "pq" corresponding to the unprocessed pixel positions (u, v) which are on the periphery of the dot formation position (x, y), if d represents the distribution of the peripheral unprocessed pixel positions and the error coefficient for pq is taken to be EC(d, pq), then the error E(u, v) at a position (u, v) is calculated according to the following equation:

$$E(u, v)=E(u, v)+Enew \times EC(d, pq).$$

The procedure then advances to step S532, and processing for the next position in the dot formation position sequence is carried out.

If, on the other hand, the inequality $|EEX(i_0)|<|EEN|$ is established in the determination at step S522, then it is determined that a dot is to be formed at the dot formation position (x, y), and at the next step S528, the quantization result corresponding to the dot model $M(i_0, x, y)$ thus determined is stored at the corresponding area B(x, y) in the result storage unit 206.

At step S530, various values are calculated in a similar fashion to the embodiments described above.

Firstly, the generated error Enew is calculated according to the formula, $Enew=EEX(i_0)$, whereupon the effect XM and the error E at the dot formation position are cleared to zero, as shown below:

$$XM(x, y)=0; \text{ and}$$

$$E(x, y)=0.$$

Furthermore, the dot model differential storage sequence XM(u, v) is calculated according to the following equation, in respect of pq, which correspond to the unprocessed pixel positions (u, v) on the periphery of the dot formation position (x, y):

$$XM(u, v)=XM(u, v)-M(i_0, x, y; pq).$$

Furthermore, the error E(u, v) at the position (u, v) is calculated according to the following formula, using the same symbols as in step S526:

$$E(u, v)=E(u, v)+Enew \times EC(d, pq).$$

The procedure then advances to step S532 and moves to the next position number in the dot formation position sequence in accordance with the array A, whereupon processing is carried out for the next formation position.

The processing has progressed in this way, and when there are no more unprocessed pixels remaining, then the whole processing sequence terminates.

According to the embodiments described above, the dot arrangement is determined in accordance with the ejection characteristics of the nozzles, and therefore, it is possible to suppress image defects arising due to the nozzle characteristics, and to form desired dots even if there is a change in the permeation characteristics of the recording medium. Consequently, it is possible to obtain a dot arrangement of a higher quality than in the related art.

Furthermore, the dot models includes information such as the dot shape, dot size, dot position, dot density, presence or absence of satellite droplets, and the like, and therefore, it is also possible to reduce variations, non-uniformity, or the like, caused by differences in the nozzle characteristics between apparatuses, or manufacturing differences within the head.

In the embodiments described above, an inkjet recording apparatus is given as an example, but the present invention is not limited to this, and it may also be applied suitably to another type of image forming apparatus which forms images by means of dots, such as a thermal printer and LED printer.

The image processing method, the image processing apparatus, and the image forming apparatus comprising the image processing apparatus according to the present invention, have been described in detail above, but the present invention is not limited to the aforementioned embodiments, and it is of course possible for improvements or modifications of various kinds to be implemented, within a range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing method, comprising the steps of:
   determining dot arrangement in forming an image with dots on a recording medium; and
   forming the image on the recording medium by means of a dot formation device according to the dot arrangement,
   wherein dot arrangement data concerning each of a plurality of dot formation positions on the recording medium is created from input image data according to a plurality of dot models, the plurality of dot models including at least one model for each of the dot formation positions, each of the plurality of dot models being determined according to at least one of dot formation characteristics of the dot formation device and fixing characteristics of the recording medium, and
   wherein each of the plurality of dot models includes information relating to at least one of a dot shape, a dot position, and presence or absence of a satellite, of each dot formed on the recording medium.

2. The image processing method as defined in claim 1, wherein, when the dot arrangement data is created from the input image data according to the plurality of dot models, dot formation is determined by comparing a prescribed threshold value with result obtained by subtracting data corresponding to density already achieved in a dot formation position under examination of the dot formation positions due to effect from at least one of the dots which are on the periphery of the dot formation position under examination, from the input image data.

3. The image processing method as defined in claim 1, wherein, when the dot arrangement data is created from the input image data according to the plurality of dot models, dot formation concerning a dot formation position under examination of the dot formation positions is determined according to effect of an error generated concerning at least one of the dot formation positions for which the dot formation is already determined and which are on the periphery of the dot formation position under examination.

4. The image processing method as defined in claim 1, wherein, when the dot arrangement data is created from the input image data according to the plurality of dot models, dot formation concerning a dot formation position under examination of the dot formation positions is determined by comparing an absolute value of an error generated if no dot is formed, with an absolute value of a generated error of the dot model having a lowest absolute value of an error generated if a dot is formed, of all the dot models which can be selected for the dot formation position under examination.

5. The image processing method as defined in claim 1, wherein the plurality of dot models include multiple dot models for each of the plurality of dot formation positions.

6. The image processing method as defined in claim 1, wherein the plurality of dot models are previously created and stored in a storage device.

7. The image processing method as defined in claim 1, wherein each of the plurality of dot models further includes information relating to dot density of each dot formed on the recording medium.

8. An image processing apparatus which determines dot arrangement in forming an image with dots on a recording medium by means of a dot formation device, the image processing apparatus comprising:
   a dot model setting device which respectively establishes a plurality of dot models with respect to a plurality of dot formation positions, each of the plurality of dot models being determined according to at least one of dot formation characteristics of the dot formation device and fixing characteristics of the recording medium, each of the plurality of dot models including information relating to at least one of a dot shape, a dot position, and presence or absence of a satellite, of each dot formed on the recording medium; and
   a halftoning device which creates dot arrangement data for each of the plurality of dot formation positions, from input image data according to the plurality of dot models.

9. The image processing apparatus as defined in claim 8, wherein the halftoning device includes:
   an effect addition unit which, when the dot arrangement data is created from the input image data according to each of the plurality of dot models, subtracts data corresponding to density already achieved in a dot formation position under examination of the dot formation positions due to effect from at least one of the dots which are on the periphery of the dot formation position under examination, from the input image data; and
   a threshold value comparison unit comparing a result obtained by the effect addition unit with a prescribed threshold value,
   wherein dot formation is determined by comparing the result obtained by the effect addition unit with the prescribed threshold value.

10. The image processing apparatus as defined in claim 8, wherein the halftoning device includes a peripheral error addition unit which, when the dot arrangement data is created from the input image data according to each of the plurality of dot models, carries out calculation according to effect on a dot formation position under examination of the dot formation positions, the effect being based on an error generated concerning at least one of the dot formation positions for which the dot formation is already determined and which are on the periphery of the dot formation position under examination.

11. The image forming apparatus as defined in claim 8, wherein the halftoning device includes:
   a generated error calculation unit which, when the dot arrangement data is created from the input image data according to each of the plurality of dot models, calculates generated errors if a dot is formed, of all the dot models which can be selected for a dot formation position under examination of the dot formation positions, and an error generated if no dot is formed; and
   a generated error comparison unit comparing an absolute value of the generated error of each of the plurality of dot models having the lowest absolute value of an error, with an absolute value of the error generated if no dot is formed,
   wherein dot formation is determined by comparing the absolute value of the generated error if no dot is formed with the lowest value of the absolute values of the generated errors of all the dot models corresponding to the dot formation position under examination.

12. The image processing apparatus as defined in claim 8, wherein the plurality of dot models include multiple dot models for each of the plurality of dot formation positions.

13. The image forming apparatus as defined in claim 8, wherein the dot model setting device includes a storage device which stores the plurality of dot models created in advance.

14. The image processing apparatus as defined in claim 8, wherein each of the plurality of dot models further includes information relating to dot density of each dot formed on the recording medium.

15. An image forming apparatus, comprising:
- an image processing device which determines dot arrangement in forming an image with dots on a recording medium by means of a dot formation device,
- wherein the image processing device includes:
- a dot model setting device which respectively establishes a plurality of dot models with respect to a plurality of dot formation positions, each of the plurality of dot models being determined according to at least one of dot formation characteristics of the dot formation device and fixing characteristics of the recording medium, each of the plurality of dot models including information relating to at least one of a dot shape, a dot position, and presence or absence of a satellite, of each dot formed on the recording medium; and
- a halftoning device which creates dot arrangement data for each of the plurality of dot formation positions, from input image data according to the plurality of dot models.

16. The image forming apparatus as defined in claim 15, wherein each of the plurality of dot models further includes information relating to dot density of each dot formed on the recording medium.

* * * * *